US008472428B2

(12) United States Patent
Reding et al.

(10) Patent No.: US 8,472,428 B2
(45) Date of Patent: Jun. 25, 2013

(54) METHODS AND SYSTEMS FOR LINE MANAGEMENT

(75) Inventors: Craig L. Reding, Midland Park, NJ (US); Mahesh Rajagopalan, Irving, TX (US); Alin D'Silva, Newton, MA (US); Ziauddin Majid, Irving, TX (US); Satya Raju, Irving, TX (US); John R. Reformato, East Meadow, NY (US); Shadman Zafar, Coppell, TX (US)

(73) Assignees: Verizon Data Services LLC, Temple Terrace, FL (US); Telesector Resources Group, Inc., New York, NY (US)

( * ) Notice: Subject to any disclaimer, the term of this patent is extended or adjusted under 35 U.S.C. 154(b) by 1321 days.

(21) Appl. No.: 10/720,971

(22) Filed: Nov. 24, 2003

(65) Prior Publication Data
US 2005/0105510 A1    May 19, 2005

Related U.S. Application Data

(63) Continuation-in-part of application No. 10/083,793, filed on Feb. 27, 2002, and a continuation-in-part of application No. 10/083,792, filed on Feb. 27, 2002, now Pat. No. 7,142,646, and a continuation-in-part of application No. 10/083,884, filed on Feb. 27, 2002, now Pat. No. 7,190,773, and a continuation-in-part of application No. 10/083,822, filed on Feb. 27, 2002, and a continuation-in-part of application No. 10/084,121, filed on Feb. 27, 2002, now abandoned.

(60) Provisional application No. 60/272,122, filed on Feb. 27, 2001, provisional application No. 60/272,167, filed on Feb. 27, 2001, provisional application No. 60/275,667, filed on Mar. 13, 2001, provisional application No. 60/275,719, filed on Mar. 13, 2001, provisional application No. 60/275,020, filed on Mar. 13, 2001, provisional application No. 60/275,031, filed on Mar. 13, 2001, provisional application No. 60/276,505, filed on Mar. 19, 2001.

(51) Int. Cl.
*H04L 12/66* (2006.01)

(52) U.S. Cl.
USPC .................................... 370/352; 379/88.11

(58) Field of Classification Search
USPC .................................... 370/352; 379/88.11
See application file for complete search history.

(56) References Cited

U.S. PATENT DOCUMENTS

| | | |
|---|---|---|
| 4,013,839 A | 3/1977 | Bell |
| 4,540,850 A | 9/1985 | Herr et al. ................. 379/88.19 |
| 4,600,814 A | 7/1986 | Cunniff et al. |
| 4,734,931 A | 3/1988 | Bourg et al. |
| 4,924,496 A | 5/1990 | Figa et al. |
| 5,014,303 A | 5/1991 | Velius |
| 5,168,515 A | 12/1992 | Gechter et al. |
| 5,222,125 A | 6/1993 | Creswell et al. |
| 5,274,700 A | 12/1993 | Gechter et al. |
| 5,327,486 A | 7/1994 | Wolff et al. ................. 379/93.23 |
| 5,329,578 A | 7/1994 | Brennen et al. |
| 5,428,663 A | 6/1995 | Grimes et al. |
| 5,440,624 A | 8/1995 | Schoof |
| 5,483,586 A | 1/1996 | Sussman |
| 5,533,096 A | 7/1996 | Bales |
| 5,535,265 A | 7/1996 | Suwandhaputra |
| 5,548,636 A | 8/1996 | Bannister et al. |
| 5,550,907 A | 8/1996 | Carlsen |
| 5,583,564 A | 12/1996 | Rao et al. |
| 5,586,173 A | 12/1996 | Misholi et al. |
| 5,588,037 A | 12/1996 | Fuller et al. |
| 5,608,788 A | 3/1997 | Demlow et al. |
| 5,619,555 A | 4/1997 | Fenton et al. |
| 5,621,787 A | 4/1997 | McKoy et al. |
| 5,623,541 A | 4/1997 | Boyle et al. |
| 5,631,904 A | 5/1997 | Fitser et al. ................. 370/261 |
| 5,638,434 A | 6/1997 | Gottlieb et al. |
| 5,649,105 A | 7/1997 | Aldred et al. |
| 5,652,789 A * | 7/1997 | Miner et al. ............. 379/201.01 |
| 5,661,788 A | 8/1997 | Chin |
| 5,668,863 A | 9/1997 | Bieselin et al. |
| 5,673,080 A | 9/1997 | Biggs et al. |
| 5,692,213 A | 11/1997 | Goldberg et al. |
| 5,710,591 A | 1/1998 | Bruno et al. |
| 5,712,903 A | 1/1998 | Bartholomew et al. |
| 5,715,444 A | 2/1998 | Danish et al. |

| | | | |
|---|---|---|---|
| 5,717,863 A | 2/1998 | Adamson et al. | |
| 5,719,925 A | 2/1998 | Peoples | |
| 5,724,412 A | 3/1998 | Srinivasan | |
| 5,742,095 A | 4/1998 | Bryant et al. | |
| 5,742,668 A | 4/1998 | Pepe et al. | |
| 5,742,905 A * | 4/1998 | Pepe et al. | 455/461 |
| 5,745,561 A | 4/1998 | Baker et al. | |
| 5,745,884 A | 4/1998 | Carnegie et al. | |
| 5,751,800 A | 5/1998 | Ardon | |
| 5,752,191 A * | 5/1998 | Fuller et al. | 455/445 |
| 5,764,901 A | 6/1998 | Skarbo et al. | |
| 5,805,670 A | 9/1998 | Pons et al. | |
| 5,841,837 A | 11/1998 | Fuller et al. | |
| 5,864,603 A | 1/1999 | Haavisto et al. | |
| 5,872,841 A | 2/1999 | King et al. | |
| 5,875,242 A | 2/1999 | Glaser et al. | 379/207 |
| 5,875,437 A | 2/1999 | Atkins | |
| 5,903,845 A | 5/1999 | Buhrmann et al. | 455/461 |
| 5,907,324 A | 5/1999 | Larson et al. | |
| 5,907,547 A | 5/1999 | Foladare et al. | 370/352 |
| 5,917,817 A * | 6/1999 | Dunn et al. | 370/352 |
| 5,917,912 A | 6/1999 | Ginter et al. | |
| 5,920,826 A | 7/1999 | Metso et al. | |
| 5,920,847 A | 7/1999 | Kolling et al. | |
| 5,926,535 A | 7/1999 | Reynolds | |
| 5,944,769 A | 8/1999 | Musk et al. | |
| 5,945,989 A | 8/1999 | Freishtat et al. | |
| 5,960,342 A | 9/1999 | Liem et al. | |
| 5,963,925 A | 10/1999 | Kolling et al. | |
| 5,982,870 A | 11/1999 | Pershan et al. | |
| 6,005,870 A | 12/1999 | Leung et al. | |
| 6,018,571 A | 1/2000 | Langlois et al. | |
| 6,018,737 A * | 1/2000 | Shah et al. | 707/10 |
| 6,021,428 A | 2/2000 | Miloslavsky | |
| 6,029,151 A | 2/2000 | Nikander | |
| 6,031,896 A | 2/2000 | Gardell et al. | |
| 6,041,103 A | 3/2000 | La Porta et al. | |
| 6,052,372 A | 4/2000 | Gittins et al. | |
| 6,058,163 A | 5/2000 | Pattison et al. | |
| 6,061,432 A | 5/2000 | Wallace et al. | |
| 6,078,658 A | 6/2000 | Yunoki | |
| 6,100,882 A | 8/2000 | Sharman et al. | |
| 6,122,348 A | 9/2000 | French-St. George et al. | |
| 6,134,318 A | 10/2000 | O'Neil | |
| 6,134,548 A | 10/2000 | Gottsman et al. | |
| 6,144,671 A | 11/2000 | Perinpanathan et al. | |
| 6,154,646 A | 11/2000 | Tran et al. | |
| 6,161,008 A | 12/2000 | Lee et al. | |
| 6,163,692 A | 12/2000 | Chakrabarti et al. | |
| 6,167,119 A * | 12/2000 | Bartholomew et al. | 379/88.04 |
| 6,188,756 B1 | 2/2001 | Mashinsky | |
| 6,189,026 B1 | 2/2001 | Birrell et al. | |
| 6,192,123 B1 | 2/2001 | Grunsted et al. | 379/350 |
| 6,195,660 B1 | 2/2001 | Polnerow et al. | |
| 6,215,863 B1 | 4/2001 | Bennett et al. | |
| 6,219,413 B1 | 4/2001 | Burg | 379/215.01 |
| 6,226,374 B1 | 5/2001 | Howell et al. | 379/207 |
| 6,240,449 B1 | 5/2001 | Nadeau | |
| 6,260,050 B1 | 7/2001 | Yost et al. | |
| 6,275,575 B1 | 8/2001 | Wu | |
| 6,282,522 B1 | 8/2001 | Davis et al. | |
| 6,298,062 B1 | 10/2001 | Gardell et al. | |
| 6,298,129 B1 | 10/2001 | Culver et al. | |
| 6,301,338 B1 | 10/2001 | Makela et al. | |
| 6,301,609 B1 | 10/2001 | Aravamudan et al. | 709/207 |
| 6,310,939 B1 | 10/2001 | Varney | |
| 6,310,947 B1 | 10/2001 | Polcyn | 379/211.01 |
| 6,324,269 B1 | 11/2001 | Malik | |
| 6,333,973 B1 | 12/2001 | Smith et al. | |
| 6,349,299 B1 | 2/2002 | Spencer et al. | |
| 6,351,279 B1 | 2/2002 | Sawyer | |
| 6,363,143 B1 | 3/2002 | Fox | |
| 6,092,102 A1 | 4/2002 | Lefeber et al. | |
| 6,371,484 B1 | 4/2002 | Yuan | |
| 6,373,817 B1 | 4/2002 | Kung et al. | |
| 6,373,930 B1 | 4/2002 | McConnell et al. | |
| 6,385,754 B1 | 5/2002 | Mizumoto et al. | |
| 6,389,113 B1 | 5/2002 | Silverman | |
| 6,404,873 B1 | 6/2002 | Beyda et al. | |
| 6,408,191 B1 | 6/2002 | Blanchard et al. | |
| 6,408,327 B1 | 6/2002 | McClennon et al. | |
| 6,411,605 B1 | 6/2002 | Vance et al. | |
| 6,418,214 B1 | 7/2002 | Smythe et al. | |
| 6,430,176 B1 | 8/2002 | Christie | |
| 6,430,289 B1 | 8/2002 | Liffick | 379/900 |
| 6,434,226 B1 | 8/2002 | Takahashi | |
| 6,442,245 B1 | 8/2002 | Castagna et al. | |
| 6,442,251 B1 | 8/2002 | Maes et al. | |
| 6,442,748 B1 | 8/2002 | Bowman-Amuah | |
| 6,453,031 B2 | 9/2002 | Malik | |
| 6,453,167 B1 | 9/2002 | Michaels et al. | |
| 6,459,780 B1 | 10/2002 | Wurster et al. | 379/142.02 |
| 6,459,913 B2 | 10/2002 | Cloutier | |
| 6,463,145 B1 | 10/2002 | O'Neal et al. | 379/211.02 |
| 6,463,464 B1 | 10/2002 | Lazaridis et al. | |
| 6,466,910 B1 | 10/2002 | Desmond et al. | |
| 6,470,079 B1 | 10/2002 | Benson | |
| 6,473,615 B1 | 10/2002 | Theppasandra et al. | |
| 6,477,374 B1 | 11/2002 | Shaffer et al. | 455/445 |
| 6,480,830 B1 | 11/2002 | Ford et al. | |
| 6,480,890 B1 * | 11/2002 | Lee et al. | 709/223 |
| 6,507,644 B1 | 1/2003 | Henderson et al. | |
| 6,519,326 B1 | 2/2003 | Milewski et al. | |
| 6,522,734 B1 | 2/2003 | Allen et al. | |
| 6,526,134 B1 | 2/2003 | Wallenius | |
| 6,532,285 B1 | 3/2003 | Tucker et al. | |
| 6,535,596 B1 | 3/2003 | Frey et al. | |
| 6,539,082 B1 | 3/2003 | Lowe et al. | |
| 6,542,596 B1 | 4/2003 | Hill et al. | |
| 6,546,005 B1 | 4/2003 | Berkley et al. | 370/353 |
| 6,547,830 B1 | 4/2003 | Mercer | |
| 6,560,329 B1 | 5/2003 | Draginich et al. | |
| 6,563,914 B2 | 5/2003 | Sammon et al. | |
| 6,564,261 B1 | 5/2003 | Gudjonsson et al. | 709/227 |
| 6,574,324 B1 | 6/2003 | Malik | |
| 6,574,470 B1 | 6/2003 | Chow et al. | |
| 6,577,622 B1 | 6/2003 | Schuster et al. | 370/352 |
| 6,577,720 B1 | 6/2003 | Sutter | |
| 6,584,122 B1 | 6/2003 | Matthews et al. | 370/493 |
| 6,590,603 B2 | 7/2003 | Sheldon et al. | |
| 6,590,969 B1 | 7/2003 | Peters et al. | |
| 6,594,352 B1 | 7/2003 | Smith | |
| 6,594,470 B1 | 7/2003 | Barnes et al. | |
| 6,600,736 B1 | 7/2003 | Ball et al. | |
| 6,609,113 B1 | 8/2003 | O'Leary et al. | |
| 6,611,590 B1 | 8/2003 | Lu et al. | |
| 6,614,786 B1 | 9/2003 | Byers | 370/353 |
| 6,618,710 B1 | 9/2003 | Zondervan et al. | |
| 6,625,258 B1 | 9/2003 | Ram et al. | |
| 6,628,194 B1 | 9/2003 | Hellebust et al. | |
| 6,628,770 B1 | 9/2003 | Jain et al. | |
| 6,631,186 B1 | 10/2003 | Adams et al. | |
| 6,636,587 B1 | 10/2003 | Nagai et al. | |
| 6,643,356 B1 | 11/2003 | Hickey et al. | |
| 6,654,768 B2 | 11/2003 | Celik | |
| 6,661,340 B1 | 12/2003 | Saylor et al. | |
| 6,665,388 B2 | 12/2003 | Bedingfield | |
| 6,668,046 B1 | 12/2003 | Albal | |
| 6,668,049 B1 | 12/2003 | Koch et al. | |
| 6,681,119 B1 | 1/2004 | Verdonk | |
| 6,683,939 B1 | 1/2004 | Chiloyan et al. | |
| 6,687,362 B1 | 2/2004 | Lindquist et al. | |
| 6,690,672 B1 | 2/2004 | Klein | |
| 6,693,897 B1 | 2/2004 | Huang | |
| 6,697,461 B1 | 2/2004 | Middleswarth et al. | |
| 6,697,796 B1 | 2/2004 | Kermani | |
| 6,704,294 B1 | 3/2004 | Cruickshank | |
| 6,711,158 B1 | 3/2004 | Kahane et al. | |
| 6,717,938 B1 | 4/2004 | D'Angelo | |
| 6,718,026 B1 | 4/2004 | Pershan et al. | |
| 6,718,178 B1 | 4/2004 | Sladek et al. | |
| 6,724,887 B1 | 4/2004 | Eibacher et al. | |
| 6,731,238 B2 | 5/2004 | Johnson | |
| 6,735,292 B1 | 5/2004 | Johnson | |
| 6,738,458 B1 | 5/2004 | Cline et al. | |
| 6,744,861 B1 | 6/2004 | Pershan et al. | |
| 6,747,970 B1 | 6/2004 | Lamb et al. | |
| 6,748,054 B1 | 6/2004 | Gross et al. | |

| Patent/Pub No. | Date | Name |
|---|---|---|
| 6,757,365 B1 | 6/2004 | Bogard |
| 6,768,788 B1 | 7/2004 | Orolin et al. |
| 6,768,790 B1 | 7/2004 | Manduley et al. |
| 6,771,949 B1 | 8/2004 | Corliss |
| 6,775,267 B1 | 8/2004 | Kung et al. |
| 6,775,546 B1 | 8/2004 | Fuller |
| 6,788,772 B2 | 9/2004 | Barak et al. |
| 6,788,775 B1 | 9/2004 | Simpson |
| 6,792,092 B1 | 9/2004 | Michalewicz |
| 6,798,753 B1 | 9/2004 | Doganata et al. |
| 6,801,610 B1 | 10/2004 | Malik |
| 6,807,258 B1 | 10/2004 | Malik |
| 6,807,259 B1 | 10/2004 | Patel et al. |
| 6,816,468 B1 | 11/2004 | Czuickshank |
| 6,816,469 B1 | 11/2004 | Kung et al. |
| 6,820,055 B2 | 11/2004 | Saindon et al. |
| 6,842,460 B1 | 1/2005 | Olkkonen et al. |
| 6,847,823 B2 | 1/2005 | Lehikoinen et al. |
| 6,853,634 B1 | 2/2005 | Davies et al. |
| 6,853,713 B1 | 2/2005 | Fobert et al. |
| 6,856,974 B1 | 2/2005 | Ganesan et al. |
| 6,876,632 B1 | 4/2005 | Takeda |
| 6,876,736 B2 | 4/2005 | Lamy et al. |
| 6,882,714 B2 | 4/2005 | Mansfield |
| 6,882,838 B1 | 4/2005 | Lee et al. |
| 6,885,742 B1 | 4/2005 | Smith |
| 6,907,111 B1 | 6/2005 | Zhang et al. |
| 6,917,610 B1 | 7/2005 | Kung et al. |
| 6,944,279 B2 | 9/2005 | Elsey et al. |
| 6,947,538 B2 | 9/2005 | Shen et al. |
| 6,954,521 B2 | 10/2005 | Bull et al. |
| 6,954,524 B2 | 10/2005 | Gibson |
| 6,956,942 B2 | 10/2005 | McKinzie et al. |
| 6,958,984 B2 | 10/2005 | Kotzin |
| 6,961,409 B2 | 11/2005 | Kato |
| 6,963,857 B1 | 11/2005 | Johnson |
| 6,970,705 B2 | 11/2005 | Yoshimoto et al. |
| 6,996,227 B2 | 2/2006 | Albal et al. |
| 6,996,370 B2 | 2/2006 | DeLoye et al. |
| 6,999,563 B1 | 2/2006 | Thorpe et al. |
| 7,024,209 B1 | 4/2006 | Gress et al. |
| 7,027,435 B2 | 4/2006 | Bardehle |
| 7,031,437 B1 | 4/2006 | Parsons et al. |
| 7,043,521 B2 | 5/2006 | Eitel |
| 7,065,198 B2 | 6/2006 | Brown et al. |
| 7,068,768 B2 | 6/2006 | Barnes |
| 7,076,528 B2 | 7/2006 | Premutico |
| 7,099,288 B1 | 8/2006 | Parker et al. |
| 7,107,312 B2 | 9/2006 | Hackbarth et al. |
| 7,116,972 B1 | 10/2006 | Zhang et al. |
| 7,127,050 B2 | 10/2006 | Walsh et al. |
| 7,130,390 B2 | 10/2006 | Abburi |
| 7,136,461 B1 | 11/2006 | Swingle et al. |
| 7,139,728 B2 | 11/2006 | Rigole |
| 7,139,782 B2 | 11/2006 | Osaki |
| 7,142,646 B2 | 11/2006 | Zafar et al. |
| 7,149,773 B2 | 12/2006 | Haller et al. |
| 7,155,001 B2 | 12/2006 | Tiliks et al. |
| 7,174,306 B1 | 2/2007 | Haseltine |
| 7,181,417 B1 | 2/2007 | Langseth et al. |
| 7,187,932 B1 | 3/2007 | Barchi |
| 7,190,773 B1 | 3/2007 | D'Silva et al. |
| 7,209,955 B1 | 4/2007 | Major et al. |
| 7,212,808 B2 | 5/2007 | Engstrom et al. |
| 7,245,929 B2 | 7/2007 | Henderson et al. |
| 7,254,220 B1 | 8/2007 | Reding et al. |
| 7,254,643 B1 | 8/2007 | Peters et al. |
| 7,283,808 B2 | 10/2007 | Castell et al. |
| 7,289,489 B1 | 10/2007 | Kung et al. |
| 7,308,087 B2 | 12/2007 | Joyce et al. |
| 7,315,614 B2 | 1/2008 | Bedingfield et al. |
| 7,379,538 B1 | 5/2008 | Ali et al. |
| 7,418,090 B2 | 8/2008 | Reding et al. |
| 7,428,580 B2 | 9/2008 | Hullfish et al. |
| 7,546,337 B1 | 6/2009 | Crawford |
| 7,616,747 B2 | 11/2009 | Wurster et al. |
| 7,912,193 B2 | 3/2011 | Chingon et al. |
| 2001/0003202 A1 | 6/2001 | Mache et al. |
| 2001/0012286 A1 | 8/2001 | Huna et al. |
| 2001/0014863 A1 | 8/2001 | Williams, III |
| 2001/0017777 A1 | 8/2001 | Maruyama et al. |
| 2001/0025262 A1 | 9/2001 | Ahmed |
| 2001/0025280 A1 | 9/2001 | Mandato et al. |
| 2001/0032181 A1 | 10/2001 | Jakstadt et al. |
| 2001/0039191 A1 | 11/2001 | Maierhofer |
| 2001/0040954 A1* | 11/2001 | Brachman et al. ....... 379/211.02 |
| 2001/0043689 A1 | 11/2001 | Malik |
| 2001/0043690 A1 | 11/2001 | Bakshi et al. |
| 2001/0043691 A1 | 11/2001 | Bull et al. |
| 2001/0051534 A1 | 12/2001 | Amin |
| 2001/0054066 A1 | 12/2001 | Spitzer |
| 2001/0056466 A1 | 12/2001 | Thompson et al. |
| 2002/0012425 A1 | 1/2002 | Brisebois et al. |
| 2002/0018550 A1 | 2/2002 | Hafez |
| 2002/0022453 A1 | 2/2002 | Balog et al. |
| 2002/0026575 A1 | 2/2002 | Wheeler et al. |
| 2002/0035617 A1 | 3/2002 | Lynch et al. |
| 2002/0040355 A1 | 4/2002 | Weiner |
| 2002/0046299 A1 | 4/2002 | Lefeber et al. |
| 2002/0055351 A1 | 5/2002 | Elsey et al. |
| 2002/0057678 A1 | 5/2002 | Jiang et al. |
| 2002/0058838 A1 | 5/2002 | Englert et al. ................. 370/352 |
| 2002/0062251 A1 | 5/2002 | Anandan et al. |
| 2002/0064268 A1 | 5/2002 | Pelletier |
| 2002/0069060 A1 | 6/2002 | Cannavo et al. |
| 2002/0069096 A1 | 6/2002 | Lindoerfer et al. |
| 2002/0071539 A1 | 6/2002 | Diament et al. |
| 2002/0073163 A1 | 6/2002 | Churchill et al. |
| 2002/0075303 A1 | 6/2002 | Thompson et al. |
| 2002/0075306 A1 | 6/2002 | Thompson et al. |
| 2002/0076022 A1 | 6/2002 | Bedingfield |
| 2002/0076026 A1 | 6/2002 | Batten |
| 2002/0076027 A1 | 6/2002 | Bernnan et al. |
| 2002/0077082 A1 | 6/2002 | Cruickshank |
| 2002/0078153 A1 | 6/2002 | Chung et al. |
| 2002/0080942 A1 | 6/2002 | Clapper .................... 379/201.01 |
| 2002/0082028 A1 | 6/2002 | Wittenkamp |
| 2002/0082030 A1 | 6/2002 | Berndt et al. |
| 2002/0083462 A1 | 6/2002 | Arnott ........................ 348/14.08 |
| 2002/0085515 A1 | 7/2002 | Jaynes et al. |
| 2002/0085687 A1 | 7/2002 | Contractor et al. |
| 2002/0085701 A1 | 7/2002 | Parsons et al. |
| 2002/0100798 A1 | 8/2002 | Farrugia et al. |
| 2002/0103864 A1 | 8/2002 | Rodman et al. |
| 2002/0103898 A1 | 8/2002 | Moyer et al. |
| 2002/0110121 A1 | 8/2002 | Mishra ........................ 370/389 |
| 2002/0115471 A1 | 8/2002 | DeLoye et al. |
| 2002/0122545 A1* | 9/2002 | Schwab et al. ........... 379/211.02 |
| 2002/0126817 A1 | 9/2002 | Hariri et al. |
| 2002/0128025 A1 | 9/2002 | Sin |
| 2002/0128033 A1 | 9/2002 | Burgess |
| 2002/0137507 A1 | 9/2002 | Winkler |
| 2002/0137530 A1 | 9/2002 | Karve |
| 2002/0138468 A1 | 9/2002 | Kermani |
| 2002/0146105 A1 | 10/2002 | McIntyre |
| 2002/0147777 A1 | 10/2002 | Hackbarth et al. |
| 2002/0147811 A1 | 10/2002 | Schwartz et al. ............. 709/225 |
| 2002/0152165 A1 | 10/2002 | Dutta et al. |
| 2002/0154210 A1 | 10/2002 | Ludwig et al. |
| 2002/0168055 A1 | 11/2002 | Crockett et al. |
| 2002/0177410 A1 | 11/2002 | Klein et al. |
| 2002/0178117 A1 | 11/2002 | Maguire et al. |
| 2003/0005150 A1 | 1/2003 | Thompson et al. |
| 2003/0014488 A1 | 1/2003 | Dalal et al. |
| 2003/0035381 A1 | 2/2003 | Chen et al. |
| 2003/0036380 A1 | 2/2003 | Skidmore |
| 2003/0045309 A1 | 3/2003 | Knotts |
| 2003/0046071 A1 | 3/2003 | Wyman et al. |
| 2003/0053612 A1 | 3/2003 | Henrikson et al. |
| 2003/0055735 A1 | 3/2003 | Cameron et al. |
| 2003/0055906 A1 | 3/2003 | Packham et al. |
| 2003/0058838 A1 | 3/2003 | Wengrovitz |
| 2003/0063732 A1 | 4/2003 | Mcknight et al. |
| 2003/0069874 A1 | 4/2003 | Hertzog et al. |
| 2003/0083040 A1 | 5/2003 | Ruth et al. |
| 2003/0092451 A1 | 5/2003 | Holloway et al. |
| 2003/0093700 A1 | 5/2003 | Yoshimoto et al. |
| 2003/0096626 A1 | 5/2003 | Sabo et al. |

| | | | |
|---|---|---|---|
| 2003/0097635 A1 | 5/2003 | Giannetti | |
| 2003/0104827 A1 | 6/2003 | Moran et al. | |
| 2003/0108172 A1 | 6/2003 | Petty et al. | |
| 2003/0112928 A1 | 6/2003 | Brown et al. | |
| 2003/0112952 A1 | 6/2003 | Brown et al. | |
| 2003/0119532 A1 | 6/2003 | Hatch | |
| 2003/0140004 A1 | 7/2003 | O'Leary et al. | |
| 2003/0142798 A1 | 7/2003 | Gavette et al. | |
| 2003/0147518 A1 | 8/2003 | Albal et al. | |
| 2003/0149662 A1 | 8/2003 | Shore | |
| 2003/0158860 A1 | 8/2003 | Caughey | |
| 2003/0165223 A1 | 9/2003 | Timmins et al. | |
| 2003/0167229 A1 | 9/2003 | Ludwig et al. | |
| 2003/0169330 A1 | 9/2003 | Ben-Shachar et al. | |
| 2003/0179743 A1 | 9/2003 | Bosik et al. | |
| 2003/0179864 A1 | 9/2003 | Stillman et al. | |
| 2003/0187992 A1 | 10/2003 | Steenfeldt et al. | |
| 2003/0208541 A1 | 11/2003 | Musa | |
| 2003/0217097 A1 | 11/2003 | Eitel | |
| 2003/0228863 A1 | 12/2003 | Vander Veen et al. | |
| 2004/0002350 A1 | 1/2004 | Gopinath et al. | |
| 2004/0002902 A1 | 1/2004 | Muehlhaeuser | |
| 2004/0019638 A1 | 1/2004 | Makagon et al. | 709/204 |
| 2004/0034700 A1 | 2/2004 | Polcyn | |
| 2004/0037409 A1 | 2/2004 | Crockett et al. | |
| 2004/0044658 A1 | 3/2004 | Crabtree et al. | |
| 2004/0052356 A1 | 3/2004 | McKinzie et al. | |
| 2004/0081292 A1 | 4/2004 | Brown et al. | |
| 2004/0103152 A1 | 5/2004 | Ludwig et al. | |
| 2004/0119814 A1 | 6/2004 | Clisham et al. | |
| 2004/0127256 A1 | 7/2004 | Goldthwaite et al. | |
| 2004/0156491 A1* | 8/2004 | Reding et al. | 379/201.02 |
| 2004/0184593 A1 | 9/2004 | Elsey et al. | |
| 2004/0203942 A1 | 10/2004 | Dehlin | |
| 2004/0208305 A1 | 10/2004 | Gross et al. | |
| 2004/0236792 A1 | 11/2004 | Celik | |
| 2004/0247088 A1 | 12/2004 | Lee | |
| 2004/0249884 A1 | 12/2004 | Caspi et al. | |
| 2004/0264654 A1 | 12/2004 | Reding et al. | |
| 2005/0053206 A1 | 3/2005 | Chingon et al. | |
| 2005/0053221 A1 | 3/2005 | Reding et al. | |
| 2005/0102382 A1 | 5/2005 | MacGregor et al. | |
| 2005/0117714 A1 | 6/2005 | Chingon et al. | |
| 2005/0129208 A1 | 6/2005 | McGrath et al. | |
| 2005/0149487 A1 | 7/2005 | Celik | |
| 2005/0191994 A1 | 9/2005 | May et al. | |
| 2005/0216421 A1 | 9/2005 | Barry et al. | |
| 2005/0220286 A1 | 10/2005 | Valdez et al. | |
| 2005/0243993 A1 | 11/2005 | McKinzie et al. | |
| 2006/0093120 A1 | 5/2006 | Thorpe et al. | |
| 2006/0095575 A1 | 5/2006 | Sureka et al. | |
| 2006/0168140 A1 | 7/2006 | Inoue et al. | |
| 2006/0276179 A1* | 12/2006 | Ghaffari et al. | 455/412.2 |
| 2006/0277213 A1 | 12/2006 | Robertson et al. | |
| 2007/0021111 A1 | 1/2007 | Celik | |
| 2009/0060155 A1 | 3/2009 | Chingon et al. | |

FOREIGN PATENT DOCUMENTS

| | | |
|---|---|---|
| CA | 2240878 | 12/1998 |
| DE | 10110942 | 9/2002 |
| EP | 0818908 | 1/1998 |
| EP | 0818908 A3 | 1/1998 |
| EP | 1014630 | 6/2000 |
| EP | 1028578 | 8/2000 |
| EP | 1161063 | 12/2001 |
| EP | 1193617 | 4/2002 |
| EP | 1235387 | 8/2002 |
| EP | 1294201 | 3/2003 |
| JP | 59-169264 | 9/1984 |
| JP | 02-260750 | 10/1990 |
| JP | 04-336742 | 11/1992 |
| JP | 05-316233 | 11/1993 |
| JP | 6-113020 | 4/1994 |
| JP | 07-030664 | 1/1995 |
| JP | 07-058856 | 3/1995 |
| JP | 07-107171 | 4/1995 |
| JP | 07-107549 | 4/1995 |
| JP | 07-123098 | 5/1995 |
| JP | 08-149226 | 6/1996 |
| JP | 08-181763 | 7/1996 |
| JP | 08-298546 | 11/1996 |
| JP | 8-331642 | 12/1996 |
| JP | 09-064869 | 3/1997 |
| JP | 09-064977 | 3/1997 |
| JP | 09-083651 | 3/1997 |
| JP | 09-200350 | 7/1997 |
| JP | 09-223087 | 8/1997 |
| JP | 9-261759 | 10/1997 |
| JP | 09-294158 | 11/1997 |
| JP | 09-294163 | 11/1997 |
| JP | 10-013546 | 1/1998 |
| JP | 10-051555 | 2/1998 |
| JP | 10-155038 | 6/1998 |
| JP | 10-173769 | 6/1998 |
| JP | 10-336319 | 12/1998 |
| JP | 11-055407 | 2/1999 |
| JP | 11-127222 | 5/1999 |
| JP | 11-136316 | 5/1999 |
| JP | 11-187156 | 7/1999 |
| JP | 11-191800 | 7/1999 |
| JP | 11-266309 | 9/1999 |
| JP | 2000-032116 | 1/2000 |
| JP | 2000-134309 | 5/2000 |
| JP | 2000-165433 | 6/2000 |
| JP | 2000-196756 | 7/2000 |
| JP | 2000-224301 | 8/2000 |
| JP | 2000-270307 | 9/2000 |
| JP | 2000-349902 | 12/2000 |
| JP | 2001-144859 | 5/2001 |
| JP | 2001-156921 | 6/2001 |
| JP | 2001-197210 | 7/2001 |
| JP | 2001-197562 | 7/2001 |
| JP | 2001-243231 | 9/2001 |
| JP | 2001-298545 | 10/2001 |
| JP | 2002-016673 | 1/2002 |
| JP | 2002-41522 | 2/2002 |
| JP | 2002-044123 | 2/2002 |
| JP | 2002-044257 | 2/2002 |
| JP | 2002-057807 | 2/2002 |
| JP | 2002-094696 | 3/2002 |
| JP | 2002-232575 | 8/2002 |
| JP | 2002-237893 | 8/2002 |
| JP | 2002-247148 | 8/2002 |
| JP | 2002-261834 | 9/2002 |
| JP | 2002-300290 | 10/2002 |
| JP | 2002-300306 | 10/2002 |
| WO | WO-98/12948 | 5/1995 |
| WO | 96/14704 | 5/1996 |
| WO | WO-97/20423 | 6/1997 |
| WO | WO-97/33421 | 9/1997 |
| WO | WO-98/02007 | 6/1998 |
| WO | 99/38309 | 7/1999 |
| WO | 00/45557 | 8/2000 |
| WO | 00/64133 | 10/2000 |
| WO | WO-00/60837 | 10/2000 |
| WO | WO01/11586 | 2/2001 |
| WO | WO 01/11586 A1 | 2/2001 |
| WO | WO-01/22751 | 3/2001 |
| WO | WO 01/35621 | 5/2001 |
| WO | WO01/52513 | 7/2001 |
| WO | WO 01/89212 | 11/2001 |
| WO | WO-02/25907 | 3/2002 |
| WO | 02/43338 | 5/2002 |

OTHER PUBLICATIONS

"FAQ Premium Home Answer" eVoice, http://content.evoice.com/wcs/signUp/FAQ_premHA_s01.htm.
"Audio Digitizing Process," TalkBank, http://www.talkbank.org/da/audiodig.html.
"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.
"Macromedia SoundEdit 16 Support Center-Working with Other Programs, What is Shockwave Audio Streaming?" http://www.macromedia.com/support/soundedit/how/shock/whatis.html.

"Chapter 3: Overview," last updated Dec. 2, 1999, http://service.real.com/help/library/guides/g270/htmlfiles/overview.htm.

"How Internet Radio Works," Howstuffworks, http://computer.howstuffworks.com/internet-radio.htm/printable.

"Real-Time Collaboration Integration in the Portal," T. Odenwald, SAP Design Guild, http://www.sapdesignguild.org/editions/edition5/synch_collab.asp.

"NetMeeting101," http://www.meetingbywire.com/NetMeeting101.htm.

"NetMeeting102," http://www.meetingbywire.com/NetMeeting102.htm.

"Instructions on Application Sharing and Data Collaboration," VCON Escort and Cruiser, http://www.vide.gatech.edu/docs/share/.

"Instructions on Multipoint Application Sharing and Data Collaboration," VCON Escort and Cruiser with the RadVision MCU, http://www.vide.gatech.edu/docs/multi-share/.

Business Solutions/Professional, http://www.accessline.com/business_sol/bs_professional_body.html.

"A Proposal for Internet Call Waiting Service Using SIP," A Brusilovsky et al., Lucent Technologies, Pint Working Group, Internet Draft, Jan. 1999.

Data Connection, MailNGen, "Next Generation Messaging for Service Providers," Data Connection Limited, Apr. 2003.

Data Connection, Strategic Computer Technology, Directory Systems, "Directories and Meta-Directories," Data Connection Ltd, 1998-2004, http://www.dataconnection.com/inetapps/directory.htm.

Data Connection, Strategic Corporation Technology, "DC-IMS\Voice Unified Messaging Gateway," Data Connection Ltd, 1998-2000, http://web.archive.org/web/20010307174512/www.dataconnection.com/messging/spivoice.htm.

Data Connection, Strategic Software Technology, "DC-SurroundSuite for Service Providers," Data Connection Ltd, 1998-2000, http://web.archive.org/web/20000914200355/www.dataconnection.com/messging/spssuite.htm.

Data Connection, Strategic Computer Technology, "Messaging Software Products and Services," Data Connection Ltd, 1998-2000, http://web.archive.org/web/20000819063320/www.dataconnection.com/messging/messgidx.htm.

Data Connection, Strategic Technology, "DC-Share for UNIX," Data Connection Ltd, 1998-2000, http://web.archive.org/web/20000914200713/www.dataconnection.com/conf/DCshare.htm.

Data Connection, Strategic Software Technology, "DC-H.323," Data Connection Ltd, 1998-2000, http://web.archive.org/web/20001120050600/www.dataconnection.com/conf/h323.htm.

Data Connection, Strategic Software Technology, "DC-WebShare," Data Connection Ltd, 1998-2000, http://web.archive.org/web/20001016115016/www.dataconnection.com/conf/webshare.htm.

Data Connection, Strategic Computer Technology, "DC-Recorder," Data Connection Ltd, 1998-2000, http://web.archive.org/web/20001060556 11/www.dataconnection.com/conf/recorder.htm.

Data Connection, Strategic Software Technology, "DC-MeetingServer," Data Connection Ltd, 1998-2000, http://web.archive.org/web/2000914200719/www.dataconnection.com/conf/meetingserver.htm.

Data Connection, Strategic Computer Technology, "DC-MeetingServer," Data Connection Ltd, 1998-2000, http://web.archive.org/web/20021201144529/www.dataconnection.com/inetapps/conferencing.htm.

Data Connection, Strategic Software Technology, "DC-VoiceNet Features," Data Connection Ltd, 1998-2000, http://web.archive.org/web/20001016102614/www.dataconnection.com/messging/vnfeat.htm.

Data Connection, Strategic Software Technology, "DC-VoiceNet," Data Connection Ltd, 1998-2000, http://web.archive.org/web/20000914200424/www.dataconnection.com/messaging/vnet.htm.

Data Connection, Strategic Computer Technology, "Messaging Software Products and Services," Data Connection Ltd, 1998-2000, http://web.archive.org/web/20010305143803/www.dataconnection.com/messging/messgidx.htm.

Data Connection, Strategic Computer Technology, "DC-SurroundSuite for Enterprises," Data Connection Ltd, 1998-2000, http://web.archive.org/web/20010306082711/www.dataconnection.com/messging/enssuite.htm.

Data Connection, "SmartDialer Functional Overview," Version v1.0, Internet Applications Group, Data Connection Ltd., Nov. 3, 2003.

Data Connection, "SIP Market Overview, An analysis of SIP technology and the state of the SIP Market," Jonathan Cumming, Data Connection Ltd., 2003-2004.

Data Connection, "Integrating Voicemail Systems, A white paper describing the integration of heterogeneous voicemail systems," Michael James, Internet Applications Group, Data Connection Ltd., 2004.

Data Connection, Strategic Computer Technology, "MailNGen: Next generation messaging for Service Providers," Data Connection Ltd, 1998-2004, http://www.dataconnection.com/messaging/.

Data Connection, Strategic Computer Technology, "MailNGen: Unified Messaging," Data Connection Ltd, 1998-2004, http://www.dataconnection.com/messaging/unified_messaging.htm.

Data Connection, Strategic Computer Technology, "MeetingServer: The award-winning web conferencing solution for Service Providers," Data Connection Ltd, 1998-2005, http://www.dataconnection.com/conferencing/.

Data Connection, Strategic Computer Technology, "MeetingServer: The web conferencing solution for Service Providers," Data Connection Ltd, 1998-2004.

Data Connection, Strategic Computer Technology, "MeetingServer: Web conferencing architecture," Data Connection Ltd, 1998-2004, http://www.dataconnection.com/conferencing/meetingserver_arch.htm.

"The Mobile Phone User Guide", http://www.mobileshop.org/usertech/wildfire.htm, printed Oct. 1, 2004.

Kornowski, J., "Wildfire at Your Back and Call-A Voice-Activated Telephone Assistant That Minds You and Your Messages", http://www.lacba.org/lalawyer/techwildfire.html, pronted Oct. 1, 2004.

Cisco Personal Assistant 1.4, Cisco Systems, Jun. 24, 2003, http://www.cisco.com/en/US/products/sw/voicesw/ps2026/prod_presentation_list.html, printed Oct. 1, 2004.

U.S. Appl. No. 09/828,679, filed Apr. 6, 2001, Reding et al.

U.S. Appl. No. 09/785,223, filed Feb. 16, 2001, Swingle et al.

"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.

"How Internet Radio Works," Howstuffworks, http://computer.howstuffworks/com/internet-radio.htm/printable.

"InteleScreener," 2003, http://wwww.intelescreener.com/howitworks.html.

"MP3 Recorder Download—MP3 Recorder—Record Audio Stream to MP3 or WAV," 2002, http://www.mp3-recorder.net.

"Voice-ASP, White Paper Technology & Processer," eVoice, Dec. 13, 2000.

"Voice-ASP, White Paper: Market Opportunities for Enhanced Voicemail," eVoice, Nov. 10, 2000.

"Supplemental Report to Diary 53, Networking the Sound Digitizing Device," Old Colorado City Communications and the National Science Foundation Wireless Field Tests, Oct. 20, 2002, Lansing, Michigan, http://wireless.com/biology/ProgressReports2002/Progress%20Reports2002/52SupplementalReport(Oct. 20, 2002).htm.

"Chapter 3: Overview," last updated Dec. 2, 1999, http://service.real.com/help/library/guides/g270/htmfiles/overview.htm.

"Telecommunications and Personal Management Services Linked in Collaboration by Verizon and Microsoft," Oct. 23, 2001, http://www.microsoft.com/presspass/press/2001/oct01/10-23MSVerizonPr.asp.

"File Transfer," Microsoft Windows Technologies Windows NetMeeting, last updates Jun. 4, 1999, http://www.microsoft.com/windows/netmeeting/features/files/default.asp.

"From Dial Tone to Media Tone," Analyst: R. Mahowald, IDC, Jun. 2002.

"MediaTone—The 'Dial Tone' for Web Communications Services," Webex, 2003.

"Accessline Comms' Accessline Service, The One-Number Wonder," CommWeb, T. Kramer, Feb. 1, 2000, http://www.cconvergence.com/article/TCM2000050450014.

"InteleScreener," 2003, http://www.intelescreener.com/howitworks.html.
"TeleZapper from Privacy Technologies," Privacy Corps—Our Review, 2002, http://www.privacycorps.com/pages/product1.htm.
"A Proposal for Internet Call Waiting Service Using SIP," A. Brusilovsky et al., Lucent Technologies, Pint Working Group, Internet Draft, Jan. 1999.
"A Model for Presence and Instant Messaging," M. Day et al., Fujitsu, Feb. 2000, Network Working Group, Request for Comments 2778.
Data Connection, Strategic Computer Technology, MeetingServer, "Broadband for Learning Case Study," Data Connection Ltd, 1998-2004, http://www.dataconnection.com/conferencing/meetingserver_casestudy.htm.
Data Connection, MailNGen, "Next Generation Messaging for Service Providers," Data Connection Limited, 2003-4.
Data Connection, Strategic Computer Technology, "Directories Explained," Data Connection Ltd, 1998-2004, http://www.dataconnection.com/inetapps/direxpl.htm.
Data Connection, Strategic Computer Technology, Directory Systems, "Directories and Meta-Directories," Data Connection Ltd, 1998-2004, http://www.dataconnection.com/inetapps/directorv.htm.
Data Connection, Strategic Computer Technology, "DS-IMS\Voice Unified Messaging Gateway," Data Connection Ltd, 1998-2000, http://web.archive.orq/web/20010307174512/www.dataconnection.com/messqinq/spivoice.htm.
Data Connection, Strategic Software Technology, "DC-SurroundSuite for Service Providers," Data Connection Ltd, 1998-2000, http://web.archive.orq/web/20000914200355/www.dataconnection.com/messqinq/spssuite.htm.
Data Connection, Strategic Computer Technology, "Messaging Software Products and Services," Data Connection Ltd, 1998-2000, http://web.archive.org/web/20000819063320/www.dataconnection.com/messqinq/messqidx.htm.
Data Connection, Strategic Software Technology, "DC-Share for UNIX," Data Connection Ltd, 1998-2000, http://web.archive.orq/web/20000914200713/www.dataconnection.com/conf/DCshare.htm.
Data Connection, Strategic Software Technology, "DC-H.323," Data Connection Ltd, 1998-2000, http://web.archive.orq/web/20001120050600/mvw.dataconnection.com/conf/h323.htm.
Data Connection, Strategic Software Technology, "DC-WebShare," Data Connection Ltd, 1998-2000, http://web.archive.orq/web/20001016115016/www.dataconnection.com/conf/webshare.htm.
Data Connection, Strategic Computer Technology, "DC-Recorder," Data Connection Ltd, 1998-2000, http://web.archive.orq/web/20001016055611/www.dataconnection.com/conf/recorder.htm.
"MP3 Recorder Download—MP3 Recorder—Record Audio Stream to MP3 or Wav," 2002 http://www.mp3-recorder.net.
"Voice-ASP, White Paper Technology & Processes," eVoice, Dec. 13, 2000.
"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/bioloqy/ProgressReports2002/Progress%20Reports2002/53SupplementalReport(Oct. 20, 2002).htm.
"Chapter 3: Overview," last updated Dec. 2, 1999, http://service.real.com/help/library/quides/g270/htmfiles/overview.htm.
"File Transfer," Microsoft Windows Technologies Windows NetMeeting, last updated Jun. 4, 1999, http://www.microsoft.com/windows/netmeeting/features/files/default.asp.
"Accessline Comms' Accessline Service, The One-Number Wonder," CommWeb, T. Kramer, Feb. 1, 2000, http://www.cconvergence.com/article/TCM20000504S0014.
"A Model for Presence and Instant Messaging", M. Day, et al. Fujitsu, Feb. 2000, Network Working Group, Request for Comments 2778.
"FAQ Premium Home Answer" eVoice, http://content.evoice.com/wcs/signUp/FAQ_premHA_s01.htm, Jul. 2, 2001.
"Audio Digitizing Process," TalkBank, http://www.talkbank.org/da/audiodig.html, Oct. 15, 2003.
"Macromedia SoundEdit 16 Support Center-Working with Other Programs, What is Shockwave Audio Streaming?" http://www.macromedia.com/support/soundedit/how/shock/whatis.html, Oct. 24, 2003.
"How Internet Radio Works," Howstuffworks, http://computer.howstuffworks.com/internet-radio.htm/printable, Oct. 16, 2003.
"Real-Time Collaboration Integration in the Portal," T. Odenwald, SAP Design Guild, http://www.sapdesignguild.org/editions/edition5/synch_collab.asp, Oct. 6, 2003.
"NetMeeting101," http://www.meetingbywire.com/NetMeeting101.htm, Oct. 6, 2003.
"NetMeeting102," http://www.meetingbywire.com/NetMeeting102.htm, Oct. 6, 2003.
"Instructions on Application Sharing and Data Collaboration," VCON Escort and Cruiser, http://www.vide.gatech.edu/docs/share/, Oct. 6, 2003.
"Instructions on Multipoint Application Sharing and Data Collaboration," VCON Escort and Cruiser with the RadVision MCU, http://www.vide.gatech.edu/docs/multi-share/, Oct. 6, 2003.
Business Solutions/Professional, http://www.accessline.com/business_sol/bs_professional_body.html, Apr. 17, 2003.
"Calendar Scheduling Teleconference Communication Mechanism," IBM Technical Disclosure Bulletin, IBM Corp. New York, US, vol. 37, No. 3, 1 Mar. 1, 1994 , p. 561.
White, "How Computers Work," Millenium Edition, Sep. 1999, Que Corporation, pp. vi-xi, 135-184, 399-421.
Derfler et al., "How Networks Work," Bestseller Edition, 1996, Ziff-Davis Press, pp. vi-ix, 1-3, 21-70, 190-198.
Gralla, "How the Internet Works," Ziff-Davis Press, 1999, pp. vi-xi, 2-3, 8-11, 308-324.
Muller, "Desktop Encyclopedia of the Internet," Artech House Inc., 1999, pp. v-xiv, 233-246, 539-559.
"www.clicktocall.com", http://replay.waybackmachine.org/20020207142936/http://www.clicktocall.com/main,htm, Internet archive of website "www.clicktocall.com", dated Feb. 7, 2002.
Gaedke, et al., "Web Content Delivery to Heterogeneous Mobile Platforms", http://citeseer.ist.psu.edu/viewdoc/summary?doi=10.1.1.33.4361, 1998, 1-14.
Gessler, et al., "PDAs as mobile WWW browers", http://citeseer.ist.psu.edu/viewdoc/summary?doi=1 0.1.1.48. 98, 1995, 1-12.
Kunz, et al., "An Architecture for Adaptive Mobile Applications", http://citeseer.ist.psu.edu/viewdoc/summary?doi=1    0.1.1.40.624, 1999, 1-15.
Lauff, et al., "Multimedia Client Implementation on Personal Digital Assistants", http://citeseer.ist.psu.edu/viewdoc/summary?doi=1 0.1.1.6.6059, 1997, 1-15.

\* cited by examiner

*Primary Examiner* — Alexander Jamal

(57) ABSTRACT

Methods and Systems are provided for managing one or more communications lines associated with a user of a communications network. A service center may receive from a user line management information regarding one or more of the user's communications lines. This line management information may include a request from the user to handle all calls to the communications line in a particular manner (e.g., forward all calls to a different number). This line management information may also include information regarding scheduling the handling of calls to the communications line (e.g., scheduling call forwarding) or a request to handle calls differently based on information identifying the origination of the call (e.g., caller-ID). The service center may then forward instructions to the communications network such that the components (e.g., SSP or SCP) of the communications network implement the user's modifications. Additionally, the service center may be provided with information, in real-time, regarding a call to the communications line that may include, for example, the caller-ID for the incoming call. The service center may then determine how the call should be handled and forward instructions to the communications network to handle the call according to the user's requests.

30 Claims, 18 Drawing Sheets

METHODS AND SYSTEMS FOR LINE MANAGEMENT

RELATED APPLICATIONS

This application is a continuation-in-part of U.S. patent application Ser. No. 10/083,793, entitled "METHOD AND APPARATUS FOR CALENDARED COMMUNICATIONS FLOW CONTROL," filed Feb. 27, 2002, U.S. patent application Ser. No. 10/083,792, entitled "VOICE MAIL INTEGRATION WITH INSTANT MESSENGER," filed Feb. 27, 2002, now U.S. Pat. No. 7,142,646; U.S. patent application Ser. No. 10/083,884, entitled "DEVICE INDEPENDENT CALLER ID," filed Feb. 27, 2002, now U.S. Pat. No. 7,190,773; and U.S. patent application Ser. No. 10/083,822, entitled "METHOD AND APPARATUS FOR A UNIFIED COMMUNICATION MANAGEMENT VIA INSTANT MESSAGING," filed Feb. 27, 2002, U.S. patent application Ser. No. 10/084,121, entitled "CALENDAR-BASED CALLING AGENTS," filed Feb. 27, 2002, now abandoned, all of which claim priority to U.S. Provisional Patent Application Nos. 60/272,122, 60/272,167, both filed Feb. 27, 2001 60/275,667, 60/275,719, 60/275,020, 60/275,031, all filed Mar. 13, 2001and 60/276,505 filed Mar. 19, 2001, and all of which are expressly incorporated herein by reference in their entirety.

Applicants also claim the right to priority under 35 U.S.C. § 119(e) based on Provisional Patent Application No. 60/428,704, entitled "DIGITAL COMPANION," filed Nov. 25, 2002; and Provisional Patent Application No. 60/436,018, entitled "DIGITAL COMPANION," filed Dec. 26, 2002, both of which are expressly incorporated herein by reference in their entirety.

The present application also relates to U.S. patent application Ser. No. 10/720,661, entitled "METHODS AND SYSTEMS FOR DRAG AND DROP CONFERENCE CALLING"; U.S. patent application Ser. No. 10/720,859, entitled "METHODS AND SYSTEMS FOR CONFERENCE CALL BUFFERING"; U.S. patent application Ser. No. 10,721,009, entitled "METHODS AND SYSTEMS FOR COMPUTER ENHANCED CONFERENCE CALLING,"; U.S. patent application Ser. No. 10/720,943, entitled "METHODS AND SYSTEMS FOR REMOTE CALL ESTABLISHMENT"; U.S. patent application Ser. No. 10/721,005, entitled "METHODS AND SYSTEMS FOR CALL MANAGEMENT WITH USER INTERVENTION"; U.S. patent application Ser. No. 10/720,868, entitled "METHODS AND SYSTEMS FOR DIRECTORY INFORMATION LOOKUP"; U.S. patent application Ser. No. 10/720,970, entitled "METHODS AND SYSTEMS FOR AUTOMATIC COMMUNICATION LINE MANAGEMENT BASED ON DEVICE LOCATION"; U.S. patent application Ser. No. 10/720,952, entitled "METHODS AND SYSTEMS FOR ADAPTIVE MESSAGE AND CALL NOTIFICATION,"; U.S. patent application Ser. No. 10/720,870, entitled "METHODS AND SYSTEMS FOR A CALL LOG"; U.S. patent application Ser. No. 10/720,633, entitled *"METHODS AND SYSTEMS FOR AUTOMATIC FORWARDING OF CALLS TO A PREFERRED DEVICE"; U.S. patent application Ser. No. 10/720,784, entitled "METHODS AND SYSTEMS FOR CONTACT MANAGEMENT,"; U.S. patent application Ser. No. 10/720,920, entitled "METHODS AND SYSTEMS FOR NOTIFICATION OF CALL TO PHONE DEVICE"; U.S. patent application Ser. No. 10/720,825, entitled "METHODS AND SYSTEMS FOR SINGLE NUMBER TEXT MESSAGING"; U.S. patent application Ser. No. 10/720,944, entitled "METHODS AND SYSTEMS FOR MULTI-USER SELECTIVE NOTIFICATION"; U.S. patent application Ser. No. 10/720,933, entitled "METHODS AND SYSTEMS FOR CPN TRIGGERED COLLABORATION"; and U.S. patent application Ser. No. 10/720,938, entitled "METHODS AND SYSTEMS FOR PREEMPTIVE REJECTION OF CALLS", all of which are expressly incorporated herein by reference in their entirety.

TECHNICAL FIELD

The present invention relates generally to data processing systems and, more particularly, to a method and system for managing one or more communications lines associated with a user of a communications network.

BACKGROUND

A wide variety of means exist for communication between users. For example, a user may conduct phone calls via a home phone, work phone, and mobile phone. In addition, users may also communicate using devices such as PC's, PDA's, pagers, etc. using manners of communicating as email and instant messaging.

Unfortunately, managing such a wide variety of communication means can be difficult. In particular, as a user changes location, communication with the user may vary. For example, while on travel, it may only be possible to reach a user by mobile phone. However, the user may best be reached by email while at work. Also, the user may wish to implement various rules for receiving and controlling communications. For example, to be reached at home, the user may want the home phone to ring three times before forwarding the call to a mobile phone. As another example, the user may wish to be paged each time an email is received from a particular person while away from the office.

A user may also wish to treat a phone call differently dependent on who is calling the user. For example, if a user receives a call from a caller that the user does not want to speak to at the moment, the user may want to send that call directly to voice mail. Also, if a user receives a call from a number that displays no caller ID information or that the user otherwise does not recognize, the user may wish to somehow specially treat the call because the caller is a potential telemarketer.

Accordingly, there is a need for methods and systems for providing a user with the capability to manage the user's communications lines.

SUMMARY

Consistent with the purposes of the invention, as embodied and broadly described herein, methods and systems are provided for managing two or more communications lines associated with a user of a communications network. These methods and systems include receiving from the user over a data network line management information regarding two or more communications lines associated with an account for the user, determining that the received line management information includes a modification to at least one of the communications lines associated with the account, and transmitting an instruction to a component of the communications network to implement the modification to the at least one communications line.

In another aspect, method and systems are provided for managing one or more communications lines associated with a user of a communications network. These methods and systems include receiving from the user over a data network line management information regarding one or more communications lines associated with an account for the user, receiving from the communications network information regarding a call received on at least one of the communications lines associated with the account, determining handling of the call based on the received line management information, and transmitting to the communications network an instruction regarding the handling of the call, such that the communications network handles the call in accordance with the received line management information.

In yet another aspect, methods and systems are provided include receiving from the user over a data network line management information regarding one or more communications lines associated with an account for the user, determining that the received line management information includes a modification to at least one of the communications lines associated with the account, and transmitting an instruction to a service control point of the communications network to implement the modification to the at least one communications line.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

The accompanying drawings, which are incorporated in and constitute a part of this specification, illustrate one embodiment of the invention and, together with the description, serve to explain the principles of the invention.

FIG. 10 illustrates an exemplary screen for entering scheduling information for call forwarding where the user has selected to repeat the settings, consistent with the principles of the present invention;

FIG. 11 illustrates an exemplary screen for entering scheduling information for call forwarding where the user has selected to repeat the settings weekly, consistent with the principles of the present invention;

DETAILED DESCRIPTION

Reference will now be made in detail to exemplary embodiments of the present invention, examples of which are illustrated in the accompanying drawings. Wherever possible, the same reference numbers will be used throughout the drawings to refer to the same or like parts.

Figure 1:
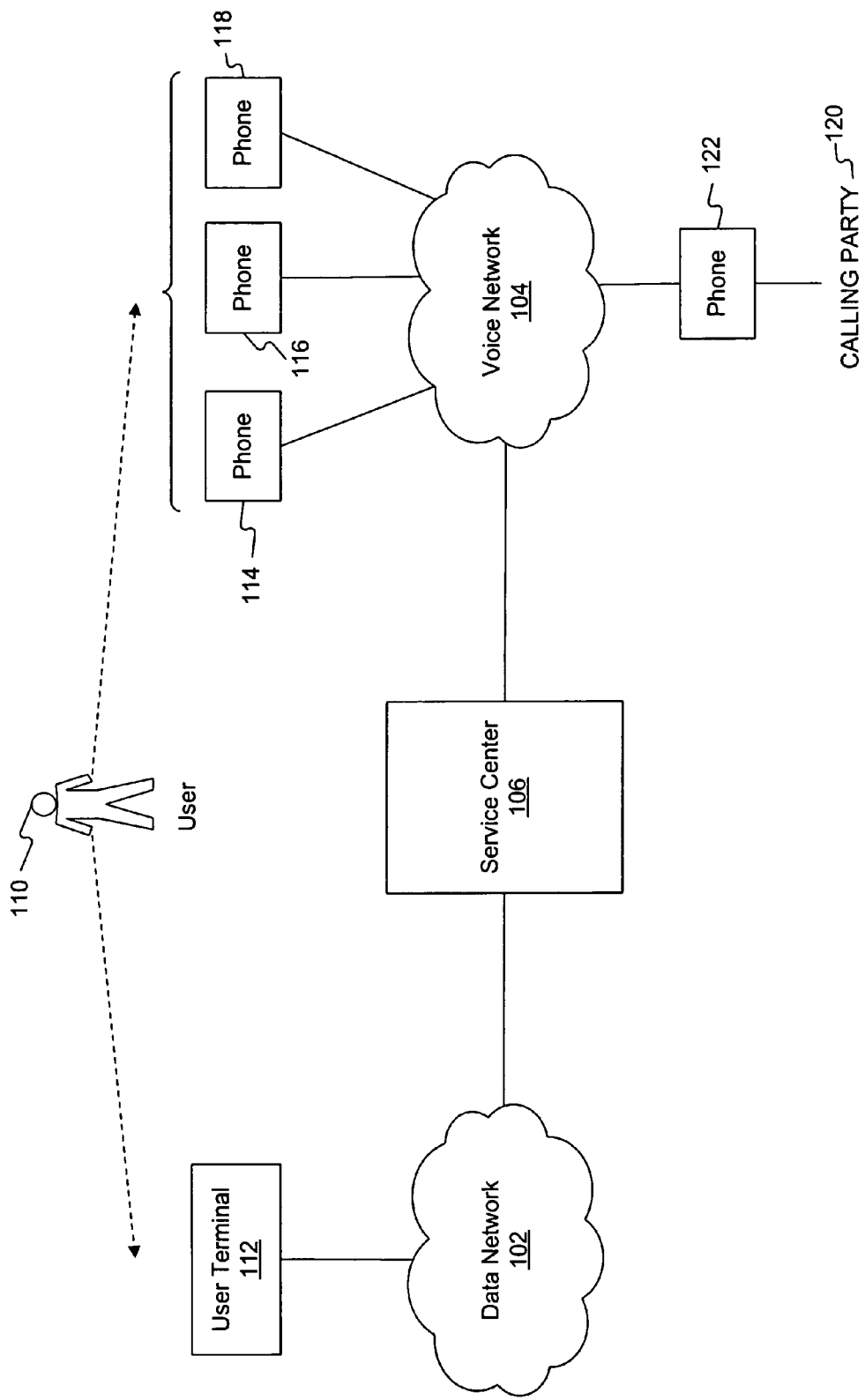
FIG. 1 is a diagram of an exemplary data processing and telecommunications environment in which features and aspects consistent with the principals of the present invention may be implemented.

FIG. 1 is a block diagram of a data processing and telecommunications environment 100, in which features and aspects consistent with the present invention may be implemented. The number of components in environment 100 is not limited to what is shown and other variations in the number of arrangements of components are possible, consistent with embodiments of the invention. The components of FIG. 1 may be implemented through hardware, software, and/or firmware. Data processing and telecommunications environment 100 may include a data network 102, a voice network 104, and a service center 106. A user 110 may use a user terminal 112 to interface with data network 102 and may use phones 114, 116, and 118 to interface with voice network 104. A calling party 120 may use a phone 122 to call a user, such as user 110, at anyone of phones 114, 116, and 118.

Data network 102 provides communications between the various entities depicted in environment 100 of FIG. 1, such as user terminal 112 and service center 106. Data network 102 may be a shared, public, or private network and encompass a wide area or local area. Data network 102 may be implemented through any suitable combination of wired and/or wireless communication networks. By way of example, data network 102 may be implemented through a wide area network (WAN), local area network (LAN), an intranet and/or the Internet. Further, the service center 106 may be connected to multiple data networks 102, such as, for example, to a wireless carrier network and to the Internet.

Voice network 104 may provide telephony services to allow a calling party, such as calling party 120, to place a call to user 110. In one embodiment, voice network 104 may be implemented using a network, such as the Public Switched Telephone Network ("PSTN"). Alternatively, voice network 104 may be implemented on a voice over broadband network, such as, for example, a network using voice-over Internet Protocol ("VoIP") technology. Additionally, in other embodiments, voice network 104 may be a video over broadband network, such as, for example, a network for providing 2-way video communications. In another example, voice network 104 may be a wireless broadband network, such as, for example, a network using WiFi (i.e., IEEE 802.11(b) and/or (g)). In yet another example, voice network 104 may be a wireless voice network(s), such as, for example, a cellular or third-generation cellular network). In addition, voice network 104 may be implemented using any single or combination of the above-described technologies consistent with the principles of the present invention. Further, service center 106 may be connected to multiple voice networks 104, such as for example, Verizon's™ Voice Network, voice networks operated by other carriers, and wireless carrier networks.

Service center 106 provides a platform for managing communications over data network 102 and voice network 104. Service center 106 also provides gateway functions, such as code and protocol conversions, to transfer communications between data network 102 and voice network 104. Service center 106 may be implemented using a combination of hardware, software, and/or firmware. For example, service center 106 may be implemented using a plurality of general purpose computers or servers coupled by a network (not shown). Although service center 106 is shown with direct connections to data network 102 and voice network 104, any number and type of network elements may be interposed between service center 106, data network 102, and voice network 104.

User terminal 112 provides user 110 an interface to data network 102. For example, user terminal 112 may be implemented using any device capable of accessing the Internet, such as a general purpose computer or personal computer equipped with a modem. User terminal 112 may also be implemented in other devices, such as the Blackberry™, and Ergo Audrey™. Furthermore, user terminal 112 may be implemented in wireless devices, such as pagers, mobile phones (with data access functions), and Personal Digital Assistants ("PDA") with network connections.

User terminal 112 also allows user 110 to communicate with service center 106. For example, user 110 may use instant messaging ("IM") to communicate with service center 106. In addition, user terminal 112 may use other aspects of TCP/IP including the hypertext transfer protocol ("HTTP"); the user datagram protocol ("UDP"); the file transfer protocol ("FTP"); the hypertext markup language ("HTML"); and the extensible markup language ("XML").

Furthermore, user terminal 112 may communicate directly with service center 106. For example, a client application may be installed on user terminal 112, which directly communicates with service center 106. Also, user terminal 112 may communicate with service center 106 via a proxy.

Phones 114, 116, 118, and 122 interface with voice network 104. Phones 114, 116, 118, and 122 may be implemented using known devices, including wireline phones and mobile phones. Although phones 114, 116, 118, and 122 are shown directly connected to voice network 104, any number of intervening elements, such as a private branch exchange ("PBX"), may be interposed between phones 114, 116, 118, and 122 and voice network 104.

Figure 2:
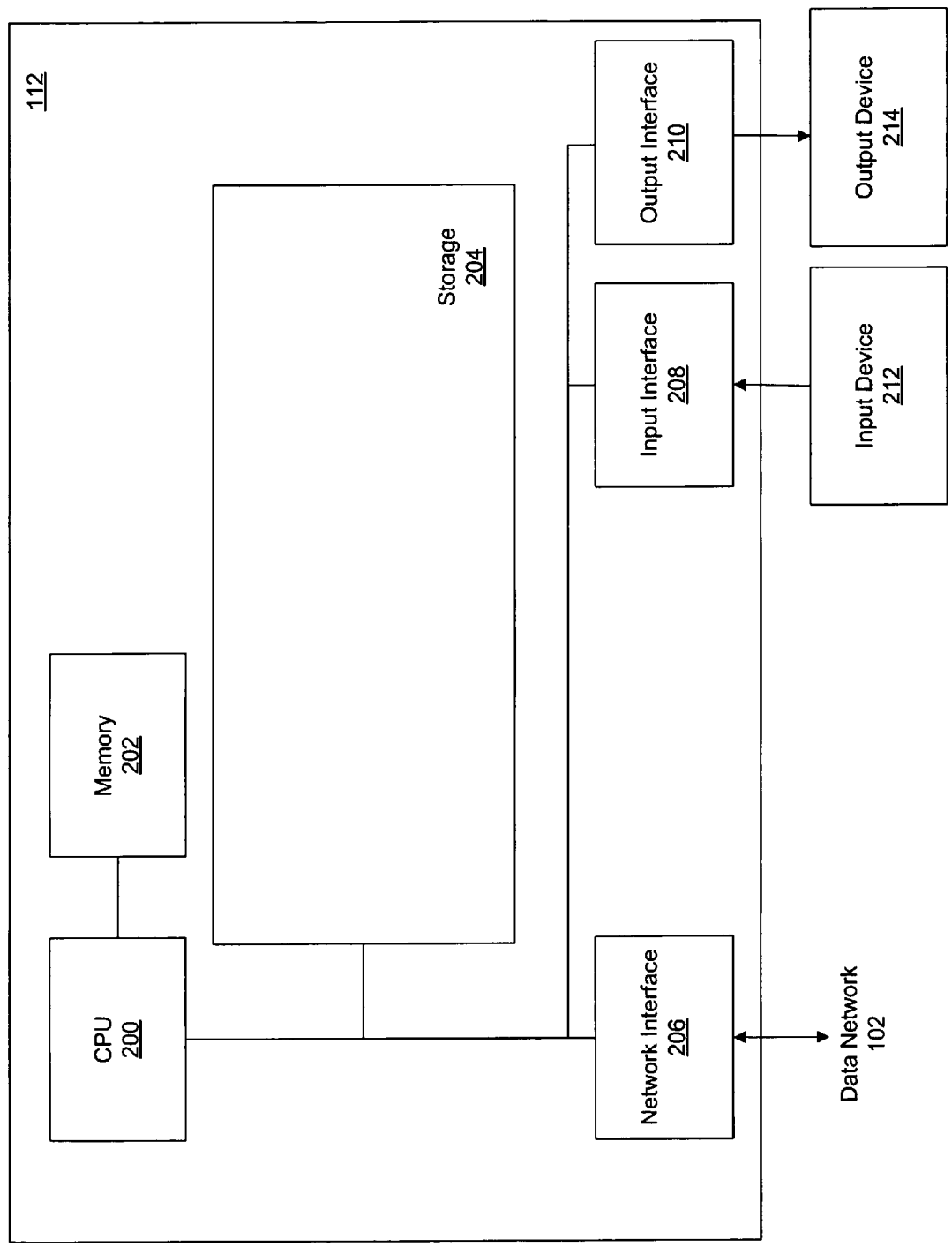
FIG. 2 is a diagram of an exemplary user terminal, consistent with the principals of the present invention.

FIG. 2 is a block diagram of a user terminal consistent with the present invention. User terminal 112 includes a central processing unit (CPU) 200, a memory 202, a storage module 204, a network interface 206, an input interface 208, an output interface 210, an input device 216, and an output device 218. CPU 200 provides control and processing functions for user terminal 112. Although FIG. 2 illustrates a single CPU, user terminal 112 may include multiple CPUs. CPU 200 may also include, for example, one or more of the following: a co-processor, memory, registers, and other processing devices and systems as appropriate. CPU 200 may be implemented, for example, using a Pentium™ processor provided from Intel Corporation.

Memory 202 provides a primary memory for CPU 200, such as for program code. Memory 202 may be embodied with a variety of components of subsystems, including a random access memory ("RAM") and a read-only memory ("ROM"). When user terminal 112 executes an application installed in storage module 204, CPU 200 may download at least a portion of the program code from storage module 204 into memory 202. As CPU 200 executes the program code, CPU 200 may also retrieve additional portions of program code from storage module 204.

Storage module 204 may provide mass storage for user terminal 112. Storage module 204 may be implemented with a variety of components or subsystems including, for example, a hard drive, an optical drive, CD ROM drive, DVD drive, a general-purpose storage device, a removable storage device, and/or other devices capable of storing information. Further, although storage module 204 is shown within user terminal 112, storage module 204 may be implemented external to user terminal 112.

Storage module 204 includes program code and information for user terminal 112 to communicate with service center 106. Storage module 204 may include, for example, program code for a calendar application, such as GroupWise provided by Novell Corporation or Outlook provided by Microsoft Corporation; a client application, such as a Microsoft Network Messenger Service (MSNMS) client or America Online Instant Messenger (AIM) client; and an Operating System (OS), such as the Windows Operation System provided by Microsoft Corporation. In addition, storage module 204 may include other program code and information, such as program code for TCP/IP communications; kernel and device drivers; configuration information, such as a Dynamic Host Configuration Protocol (DHCP) configuration; a web browser, such as Internet Explorer provided by Microsoft Corporation, or Netscape Communicator provided by Netscape Corporation; and any other software that may be installed on user terminal 112.

Network interface 206 provides a communications interface between user terminal 112 and data network 102. Network interface 206 may receive and transmit communications for user terminal 112. For example, network interface 206 may be a modem, a local area network ("LAN") port, a wireless modem, or a wireless data port.

Input interface 208 receives input from user 110 via input device 212 and provides the input to CPU 200. Input device 212 may include, for example, a keyboard, a microphone, and a mouse. Other types of input devices may also be implemented consistent with the principles of the present invention.

Output interface 210 provides information to user 110 via output device 214. Output device 214 may include, for example, a display, a printer, and a speaker. Other types of output devices may also be implemented consistent with the principles of the present invention.

Figure 3:
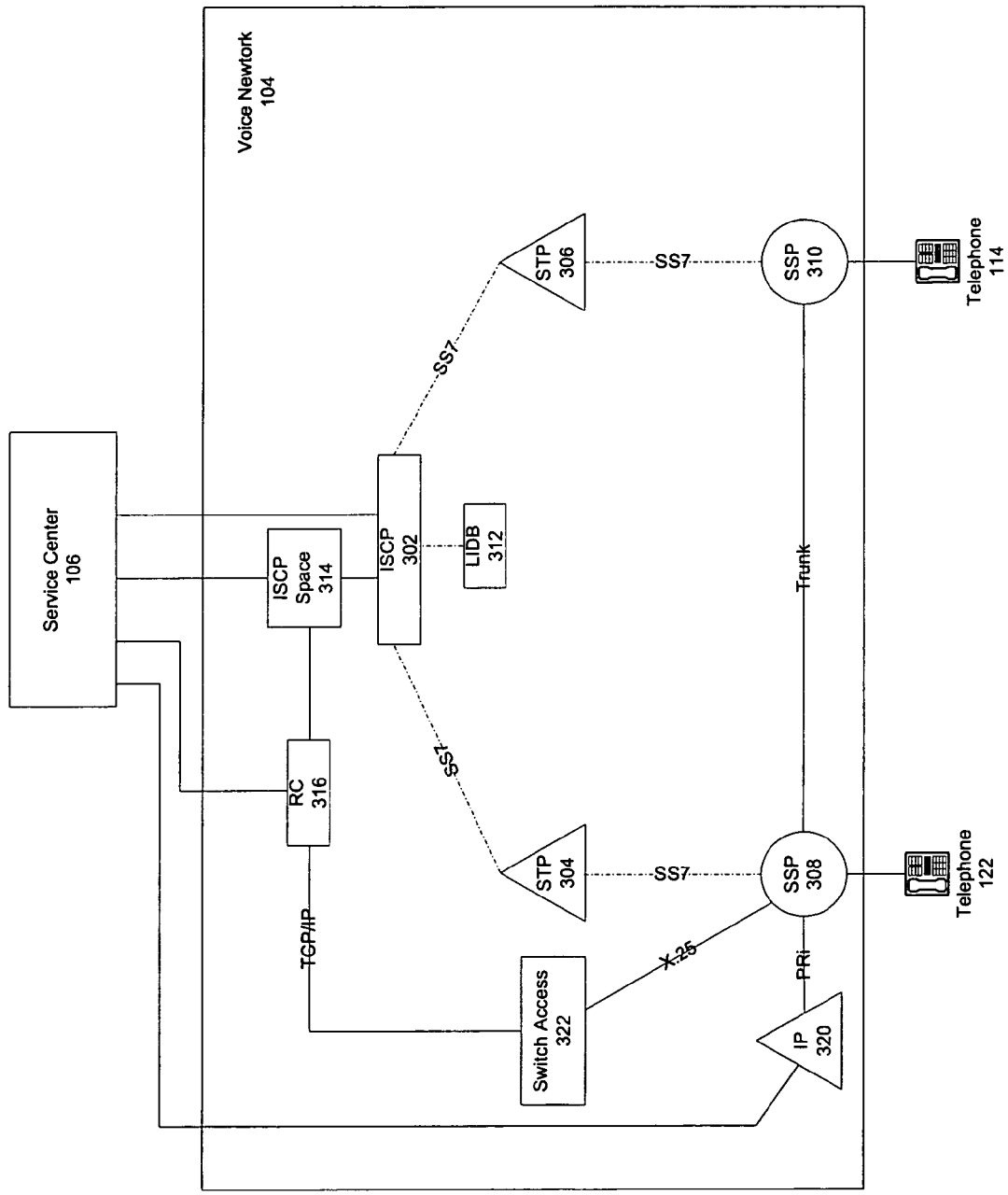
FIG. 3 is a diagram of a voice network, consistent with the principles of the present invention.

FIG. 3 is a diagram of a voice network, consistent with the principles of the present invention. As shown, voice network 104 includes an intelligent service control point (ISCP) 302, service transfer points (STP) 304 and 306, service switching points (SSP) 308 and 310, a line information database (LIDB) 312, an ISCP Service Provisioning And Creation Environment (SPACE) 314, a Recent Change Environment 316, and an Intelligent Peripheral (IP) 320. Although in this embodiment voice network 104 is described as a PSTN, as discussed above in other embodiments, voice network 104 may be, for example, a voice or video over broadband network a wireless broadband, a wireless voice network, etc.

Voice network 104 may be implemented using the PSTN and SS7 as a signaling protocol. The SS7 protocol allows voice network 104 to provide features, such as call forwarding, caller-ID, three-way calling, wireless services such as roaming and mobile user authentication, local number portability, and toll-free/toll services. The SS7 protocol provides various types of messages to support the features of voice network 104. For example, these SS7 messages may include Transaction Capabilities Applications Part ("TCAP") messages to support event "triggers," and queries and responses between ISCP 302 and SSPs 308 and 310.

ISCP 302 may also be, for example, a standard service control point (SCP), an Advanced Intelligent Network (AIN) SCP, a soft switch, or any other network call controller. As used herein, the term service control point (SCP) is a generic term that covers standard SCPs, ISCPs and AIN SCPs. ISCP 302 provides translation and routing services of SS7 messages to support the features of voice network 104, such as call forwarding. In addition, ISCP 302 may exchange information with the service center 106 using TCP/IP or SS7. ISCP 302 may be implemented using a combination of known hardware and software. ISCP 302 is shown with both a direct connection to service center 106 and a connection through ISCP SPACE 314, however, any number of network elements including routers, switches, hubs, etc., may be used to connect ISCP 302, ISCP SPACE 314, and service center 106. Further, information exchanged between ISCP 302 and service center 106 may use, for example, the SR-3389 General Data Interface (GOI) for TCP/IP.

STPs 304 and 306 relay SS7 messages within voice network 104. For example, STP 304 may route SS7 messages between SSPs 308 and 310. STP 302 may be implemented using known hardware and software from manufacturers such as NORTEL™ and LUCENT Technologies™.

SSPs 308 and 310 provide an interface between voice network 104 and phones 114 and 122, respectively, to setup, manage, and release telephone calls within voice network 104. SSPs 308 and 310 may be implemented as a voice switch, an SS7 switch, or a computer connected to a switch. SSPs 308 and 310 exchange SS7 signal units to support a telephone call between calling party 120 and user 110. For example, SSPs 308 and 310 may exchange SS7 messages, such as TCAP messages, within message signal units ("MSU") to control calls, perform database queries to configuration database 312, and provide maintenance information.

Line Information Database (LIDB) 312 comprises one or more known databases to support the features of voice network 104. For example, LIDB 312 may include user information, such as a service profile, name and address, and credit card validation information. Although, in this figure, LIDB 312 is illustrated as directly connected to ISCP 302, LIDB 312 may be connected to ISCP 302 through an STP (e.g., 304 and 306). Additionally, this communication link may use, for example, the GR-2838 General Dynamic Interface (GDI) for SS7.

ISCP Service Provisioning and Creation Environment (SPACE) 314 may be included as part of ISCP 302 or be separate from ISCP 302. For example, the Telcordia™ ISCP may include an environment similar to SPACE 314 as part of the product. Further, ISCP SPACE 314 may include one or more servers. ISCP SPACE 314 is the point in the ISCP platform where user record updates may be made.

In one embodiment, user records may be stored in ISCP SPACE 314 such that the records may be updated and sent to ISCP 302. These records may include information regarding how to handle calls directed to the user. For example, these user records may include information regarding whether or not calls for the user are to be forwarded to a different number, and/or whether or not the call should be directed to an IP, such as a voice mail system, after a certain number of rings. Additionally, one ISCP SPACE 314 may provide updates to one or more ISCPs 302 via an ISCP network (not shown).

Additionally, the voice network 104 may include one or more recent change engines 316 such as, for example, an Enterprise Recent Change engine (eRC); an Assignment, Activation, and Inventory System (AAIS); or a multi-services platform (MSP). As an example, the eRC and AAIS may be used in voice networks 104 located in the western part of the United States, while an MSP may be used in networks in the eastern part. The recent change engines may be used to update switch and ISCP databases. For example, a recent change engine may deliver database updates to SSPs and to ISCPs, such that when updating databases, these recent change engines emulate human operators. Additionally, if the instructions are to be sent to an ISCP 302, the recent change engine may first send the instructions to ISCP SPACE 314, which then propagates the instructions to ISCP 302 as discussed above. Further, an MSP may be used, for example, for providing updates to both SSPs 308 or 310 and ISCPs 302. Or, for example, an eRC may be used for providing updates to SSPs 308 or 310, while an AAIS is used for providing updates to the ISCPs 302. Additionally, updates sent to SSPs 308 or 310 may be sent from recent change engine 316 via a switch access 320 that may, for example, convert the updates into the appropriate protocol for SSP 308 or 310. For example, recent change engine 316 may send updates to SSPs 308 or 310 via TCP/IP. Switch access 320 may then convert the updates from TCP/IP to X.25. This switch access 320 may be any appropriate type of hardware and/or software. Additionally, these connections may include any number of elements, such as, for example, switches, routers, hubs, etc. and may be, for example, an internal data network for voice network 104.

Additionally, voice network 104 may include one or more intelligent peripherals (IP). For example, in FIG. 3, an IP 320 is illustrated as being connected to SSP 308. These IPs may be used for providing services, such as voice mail services. Additionally, the communications between SSP 308 and IP 320 may use the Primary Rate interface (PRi) (e.g., the 1129 protocol) protocol. Additionally, IP 320 may be capable of sending and receiving information to/from service center 106. These communications may use, for example, the SR-3511 protocol. Further, although FIG. 3 illustrates this connection as a direct connection, this connection may include any number of elements including routers, switches, hubs, etc., and may be via, for example, an internal data network for voice network 104.

Figure 4:
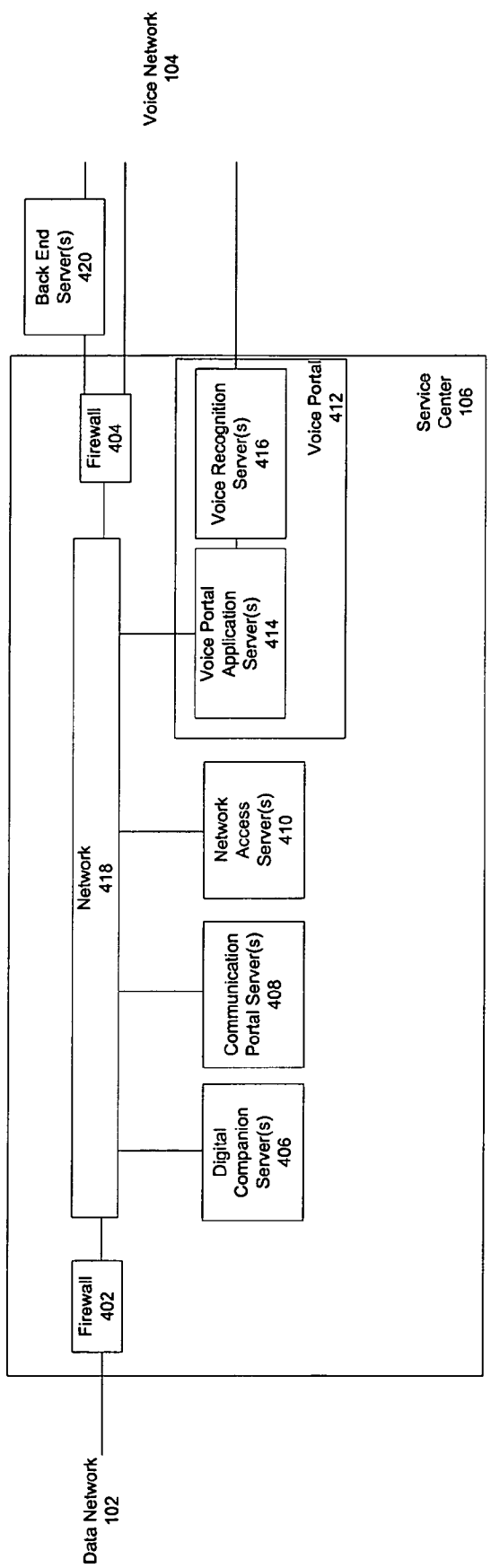
FIG. 4 is a block diagram of a service center, consistent with the principles of the present invention.

FIG. 4 is a block diagram of service center 106, consistent with the principles of the present invention. As shown, service center 106 may include firewalls 402 and 404, one or more digital companion servers 406, one or more communication portal servers 408, one or more network access servers 410, and a voice portal 412. Voice portal 412 may include a voice portal application server 414 and a voice recognition server 416. A network 418 may be used to interconnect the firewalls and servers. Additionally, back end server(s) 420 may be provided between the service center 106 and the voice network 104.

Firewalls 402 and 404 provide security services for communications between service center 106, data network 102, and voice network 104, respectively. For example, firewalls 402 and 404 may restrict communications between user terminal 112 and one or more servers within service center 106. Any appropriate security policy may be implemented in firewalls 402 and 404 consistent with the principles of the present invention. Firewalls 402 and 404 may be implemented using a combination of known hardware and software, such as the Raptor Firewall provided by the Axent Corporation. Further, firewalls 402 and 404 may be implemented as separate machines within service center 106, or implemented on one or more machines external to service center 106.

Network 418 may be any appropriate type of network, such as an Ethernet or FDDI network. Additionally, network 418 may also include switches and routers as appropriate without departing from the scope of the invention. Further, additional firewalls may be present in network 418, for example, to place one or more of servers 406, 408, 410, or voice portal 412 behind additional firewalls.

Each server (406, 408, 410, 414, 416, 420) may be any appropriate type of server or computer, such as a Unix or DOS based server or computer. The servers may implement various logical functions, such as those described below. In FIG. 4, a different server is illustrated as being used for each logical function. In other embodiments, the logical functions may be split across multiple servers, multiple servers may be used to implement a single function, all functions may be performed by a single server, etc.

In general, a digital companion server 406 may provide the software and hardware for providing specific services of the service center. Exemplary services include, for example, permitting a user to add contacts to the user's address book from a history of calls made or received by the user, permitting a user to make calls directly from the user's address book, scheduling a call to be placed at a specific time, or permitting the user to look at the name and/or address associated with a phone number. Additionally, these services may include permitting the user to listen to the user's voice mail on-line, forwarding the user's calls based on a scheduler and/or the calling parties number, setting up conference calls on-line, etc.

A communication portal server 408 may provide the hardware and software for managing a user's account and interfacing with user account information stored by the provider of user's voice network 104. Network access servers 410 may provide the hardware and software for sending and receiving information to voice network 104 in processing the applications provided by the service center. For example, network access servers 410 may be used for transmitting and/or receiving information from/to ISCP 302 or SSP 308 or 310 of voice network 104.

Voice portal 412 includes software and hardware for receiving and processing instructions from a user via voice. For example, a user may dial a specific number for voice portal 412. Then the user using speech may instruct service center 106 to modify the services to which the user subscribes. Voice portal 412 may include, for example, a voice recognition function 416 and an application function 414. Voice recognition function 416 may receive and interpret dictation, or recognize spoken commands. Application function 414 may take, for example, the output from voice recognition function 416, convert it to a format suitable for service center 106 and forward the information to one or more servers (406, 408, 410) in service center 106.

Figure 5:
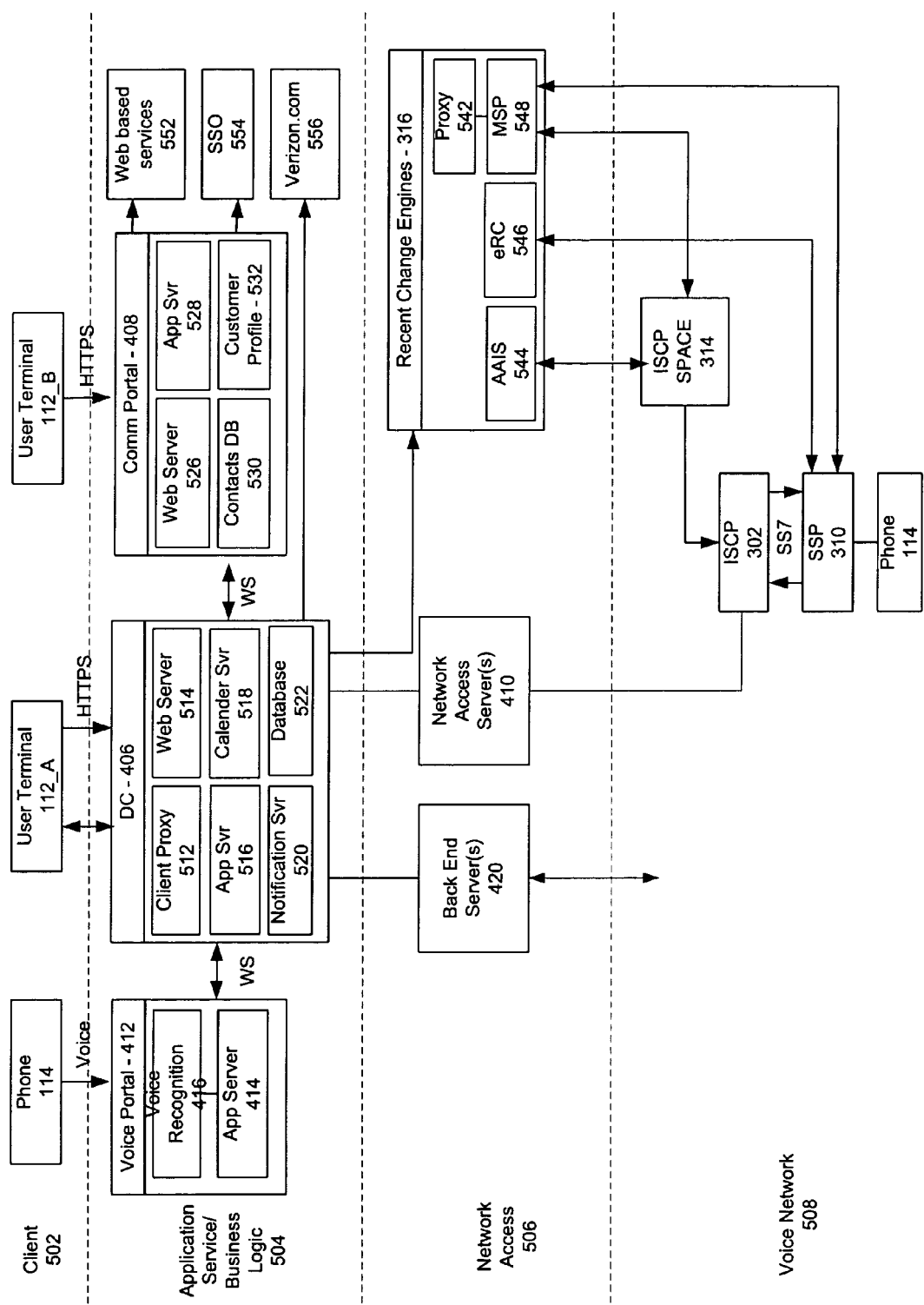
FIG. 5 illustrates a logical architecture of an exemplary system, consistent with the principles of the present invention.

FIG. 5 illustrates a logical architecture of an exemplary system, consistent with the present invention. As illustrated, the logical architecture may be split into four planes: client side plane 502, application service plane 504, network access plane 506, and voice network plane 508.

Client side plane 502 includes user terminals 112_A and 112_B that a user may use to send and/or receive information to/from service center 106. Additionally, client side 502 includes user's phone(s) 114. As discussed above, user terminals 112 may be any appropriate type of device a user may use for communicating with service center 106. For example, user terminal 112_A may be a PDA running a program (e.g., a client application) for communicating with service center 106, while user terminal 112_B may be a desktop type computer running a web browser for communicating with the service center 106 via the Internet. Additionally, the user may have one or more phones 114, such as, for example, one or more standard landline telephones and/or wireless phones.

Application service plane 504 includes digital companion server(s) 406, communication portal server(s) 408, and voice portal 412. These entities may communicate between one another using, for example, web services or any other suitable protocols. Web services are a standardized way of integrating Web-based applications using the Extensible Markup Language (XML), Simple Object Access Protocol (SOAP), Web Services Description Language (WSDL) and Universal Description, Discovery and Integration (UDDI) open standards over an Internet protocol (IP) backbone.

As illustrated, a digital companion server 406 may provide the following functions: a client proxy 512, a web server 514, an application server function 516, a calendar server function 518, a notification server function 520, and a database function 522. Each of these functions may be performed in hardware, software, and/or firmware. Further, these functions may each be executed by a separate server, split across multiple servers, included on the same server functions, or any other manner.

Client proxy function 512 provides a proxy function for the digital companion that may be used for security purposes. This client proxy function 512 may be included in a separate server such that all communications sent from the other digital companion functions/servers to a user terminal 112 via data network 102 go through client proxy 512. Also, if client proxy 512 is included on a separate server, for example, an additional firewall may be provided between client proxy 512 and the other digital companion servers to provide additional security.

Web server 514 provides functionality for receiving traffic over data network 102 from a user. For example, web server 514 may be a standard web server that a user may access using a web browser program, such as Internet Explorer or Netscape Communicator.

Application server function 516 encompasses the general functions performed by digital companion server(s) 406. For example, these functions may include interfacing with the various other digital companion functions to perform specific applications provided by the service center. These services may include, for example, interfacing with other function(s), software, and/or hardware to provide a user with the capability of managing the user's calls online. For example, permitting a user to add contacts to the user's address book from a history of calls made or received by the user, permitting a user to make calls directly from the user's address book, scheduling a call to be placed at a specific time, or permitting the user to look at the name and/or address associated with a phone number. Additionally, these services may include permitting the user to listen to the user's voice mail on-line, forwarding the user's calls based on a scheduler and/or the calling parties number, setting up conference calls on-line, etc.

Additionally, application server function 516 may interface with one or more external devices, such as an external web server, for retrieving or sending information. For example, application server function 516 may interface with a voice network's data center 556 (e.g., verizon.com) to determine the services to which the user subscribes (e.g., call waiting, call forwarding, voice mail, etc.).

Calendar server function 518 may provide the capability of scheduling events, logging when certain events occurred, triggering the application-functions to perform a function at a particular time, etc.

Notification server function 520 provides the capability to send information from the service center 106 to a user terminal 112. For example, notification server function 520 at the direction of application server function 516 may send a notification to user terminal 112 that the user is presently receiving a phone call at user's phone 114.

Database function 522 provides the storage of information useable by the various applications executed by the digital companion servers. These databases may be included in, for example, one or more external storage devices connected to the digital companion servers. Alternatively, the databases may be included in storage devices within the digital companion servers themselves. The storage devices providing database function 522 may be any appropriate type of storage device, such as for example, CD-ROMs, DVD's, disk drives, magnetic tape, etc.

As discussed above, communication portal server(s) 408 provide the hardware and software for managing a user's account and interfacing with user account information stored by the provider of user's voice network 104. As illustrated in FIG. 5, a communication portal server 408 may provide the following functions: a web server function 526, an application server function 528, a contacts database function 530, and/or a user profile function 532. Each of these functions may be performed by a separate server, split across multiple servers, included on the same server functions, or any other manner.

Web server function 526, as with web server function 522 of the digital companion servers, provides functionality for receiving traffic over data network 102 from a user. For example, the web server may be a standard web server that a user may access using a web browser, such as Internet Explorer or Netscape Communicator.

Application server function 528 encompasses the general functions performed by communication portal servers 406. For example, these functions may include interfacing with the voice network to retrieve and/or modify user profile information, and creating and editing an address book for the user. Additionally, application server function 528 may include the functionality of sending and/or receiving information to/from external servers and/or devices. For example, communication portal servers 408 may be connected to a network, such as, the Internet. Application server function 528 may then provide connectivity over the Internet to external servers 552 that provide web services, such as the Superpages webpage. Application function 528 could then contact these external services 552 to retrieve information, such as an address for a person in user's address book.

In another example, application server function 528 of communication portal 408 may interface a single sign on (SSO) server 554. SSO 554 may be used to allow users to access all services to which the user subscribes, on the basis of a single authentication that is performed when they initially access the network.

Contacts database 530 includes storage devices for storing an address book for the user. This address book may be any appropriate type of address book. For example, a user's address book may include the names, phone numbers, and addresses of people and/or organizations. The storage devices of database 530 may be internal or external to communication portal servers 406 or some combination in between. In addition, these storage devices may be any appropriate type of storage device, such as magnetic storage, memory storage, etc.

User profile database 532 includes storage devices for storing user profile information for the user. These storage devices may be the same or separate storage devices used for the contacts database. The user profile may include information regarding user's account for the user's voice network. For example, this information may include user's name, billing address, and other account information. Additionally, the user profile may include information regarding voice services to which the user subscribes, such as, for example, call waiting, voice mail, etc.

Additionally, application services plane 504 of the architecture may include a voice portal 412. As discussed above, voice portal 412 may include, for example, a voice recognition function 416 and an application server function 414, and be used for receiving and processing instructions from a user via voice. The voice recognition function may be implemented using hardware and/or software capable of providing voice recognition capabilities. This hardware and/or software may be a commercially available product, such as the Voice Application platform available from Tellme Networks, Incorporated. Application server function 414 of voice portal 412 may include hardware and/or software for exchanging information between digital companion servers 406 and voice recognition function 416. Additionally, application server function 414 may be included on a separate server, included in the hardware and software providing voice recognition function 416, included in digital companion servers 406, etc.

Network Access plane 506 of the architecture includes the functions for providing connectivity between application service plane 502 and voice network 104. For example, network access plane 506 may include the recent change engines 316, network access servers 410, and/or back end servers 420.

As discussed above, recent change engines 316 may be used to update switches and ISCP databases included in voice network 104. In one embodiment, recent change engines 316 may include an MIS 544, an eRC 546, and/or an MSP 548. Additionally, a proxy 542 may be used between digital companion servers 406 and recent change engines 542 for security purposes.

Network access servers 410 may be included in service center 106 and may provide the hardware and software for sending and receiving information to voice network 410 in processing the applications provided by the service center. For example, network access servers 410 may include a Caller ID (CID) functionality for retrieving caller ID information from the voice network 104, a click to dial (CTD) functionality for instructing an intelligent peripheral (IP) in the voice network to place a call via an SSP, and/or a real time call management (RTCM) functionality for interfacing with an ISCP of the voice network.

Network Access plane 506 may also include one or more back end server(s) 420. Back end server(s) 420 may include hardware and/or software for interfacing service center 106 and voice network 104. Back end server(s) 420 may be connected to service center 106 by a network, by a direct connection, or in any other suitable manner. Further, back end server(s) 420 may connect to one or more devices in voice network 104 by a network, a direct connection, or in any other suitable manner.

Back end server(s) 420 may include, for example, a server providing a voice mail retrieval and notification function. For example, this voice mail retrieval and notification function may include the capability to receive notifications when a user receives a voice mail, physically call a user's voice mail system, enter the appropriate codes to retrieve the voice mail, retrieve the voice mail, convert the voice mail to a digital file, and send it to digital companion servers 406.

Additionally, back end server(s) 420 may also include, for example, a directory assistance server. This directory assistance server may, for example, interface service center 106 with a Reverse Directory Assistance Gateway (RDA Gateway) of voice network 104. A RDA Gateway is a device for issuing requests to a Data Operations Center (DOC) of voice network 104 for name and/or address information associated with a phone number and receiving the name and/or phone number in response to this request.

In another example, back end server(s) 420 may include a wireless internet gateway that is used for interfacing with a mobile switching center (MSC) of a wireless voice network. As with the above-described back end server(s) 420, this wireless internet gateway may be used for converting requests and information between the formats used by service center 106 and those used by the wireless voice network.

In yet another example, back end server(s) 420 may include a conference blasting server for instructing a conference bridge in voice network 106 to dial out via an SSP to the participants of a voice conference. Or for example, the back end server(s) may include a server for instructing an IP of the voice network to place a call between two parties by dialing out to each of the parties. The back end server(s) may also include the capability to instruct the bridge or IP device to call an audio digitizing device that can listen to the conference, convert the audio signals to digital format, and forward the digitized signals to a user device via, for example, an audio streaming server. The audio streaming server may, for example, allow a user to connect to it via, for example, the Internet. Additionally, the audio streaming device may buffer or record the signals to permit the user to pause, rewind, and/or fast-forward thru the conference.

In yet another example, back end server(s) 420 may include a Single Number Short Message Service (SN SMS) server for interfacing service center 106 with a SMS gateway in voice network 104. This may be used for example to permit the user to have SMS messages addressed to the user's home phone number directed to an SMS capable device of the users choosing.

Voice network plane 508 includes the hardware and software included in voice network 104, as discussed above with reference to FIG. 3. For example, voice network plane 508 may include ISCP SPACE 314, ISCP 302, intelligent peripherals 320, and SSP 308. Additionally, voice network plane 508 may also include the hardware and software included in a wireless carrier's network, such as, for example, the mobile switching center, etc.

The following provides a more detailed description of methods and systems for line management. For example, when a call directed to a user at phone 114 arrives at SSP 310 servicing user's phone 114, the user may specify that an particular action be automatically taken. The specified action may be, for example, based on criteria, such as the calling parties name/number, the time/day, etc. These actions may include call forwarding, call forwarding based on the calling parties phone number, sending a call to voicemail, and playing an announcement. Additionally, these actions may also include playing a Supplemental Information Tone (SIT), such as described in U.S. patent application Ser. No. 10/720,938, entitled Methods and Systems for Methods and Systems for Preemptive Rejection of Calls, which is incorporated by reference herein in its entirety. A SIT tone is a particular sequence of tones that are used to provide information regarding a number (i.e., a communications line), such as that the number is unavailable, and is further described in ITU Recommendation E.180 entitled Various tones Used in National Networks. Also, such actions may include blocking at user's direction all calls to user's phone and having him sent directly to voice mail. The following provides a more detailed description of exemplary embodiments for providing a user with the capability to manage one or more communications lines associated with the user such that calls directed to the communication line are handled automatically based upon user provided line management information.

As discussed above, user terminal 112_A may execute a client application (hereinafter referred to as the Digital Companion ("DC") client application). This DC client application preferably can access digital companion server(s) 406 via, for example, the Internet. This DC client application preferably may retrieve information from the digital companion server(s) regarding user's communication lines (e.g., the user's home phone, work phone, cell phone, etc.) that the user has elected to subscribe to digital companion services. Further, as discussed above, the user may also access and retrieve such information from the digital companion server(s) via a browser operating on a user terminal 112_B via communication portal 408. Or, as discussed above, the user may access and retrieve such information from the digital companion server(s) via voice portal 412 using a phone 114.

In this example, the user may be able to register, for example, using the DC client application or browser, one or more communications devices, that is, phones, wireless PDAs, computers, etc. with digital companion server(s) 406. This list of devices will be referred to as user's device profile and may include, for example, a name for the device, a phone number for the device if its is a phone, an IP address for the device if the device is a device with Internet connectivity (e.g., a wireless PDA, computer, etc.). This information may be provided by the user via, for example, the DC client application or browser. Or, if the communications line for the device is associated with the voice network, information may be retrieved by the communication portal, as discussed above.

As discussed above, in an exemplary embodiment, the user may elect to have all the user's calls for any of the user's communication lines (i.e., a communications device) automatically handled in a particular manner. The following provides a description of an example in which the user selects to have all calls to a particular one of the user's communications lines forwarded to another one of the devices in the user's device profile or to another user specified device or number. For example, if the user is planning on being away from the office, they may elect to have calls made to the user's office automatically forwarded to the user's cellular phone.

Figure 6:
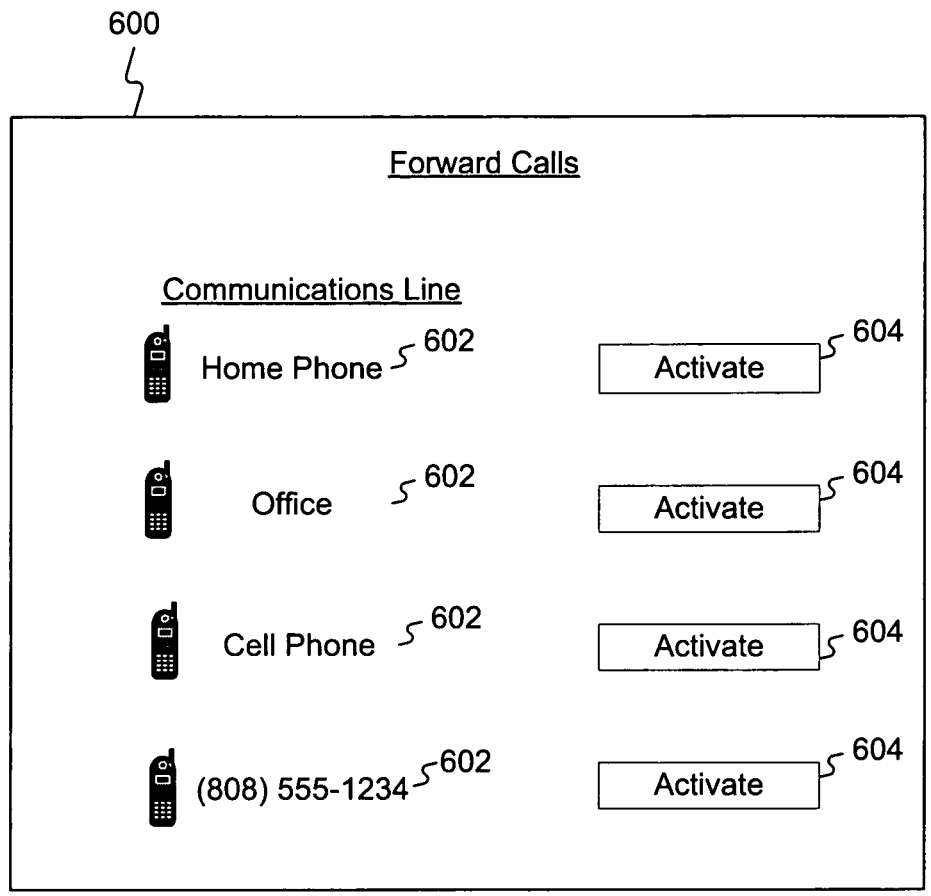
FIG. 6 illustrates an exemplary screen shot of a screen that may be displayed to a user in response to the user electing to activate call forwarding, consistent with the principles of the present invention.

FIG. 6 illustrates an exemplary screen shot of a screen 600 that may be displayed to a user in response to the user electing to activate call forwarding. As illustrated, screen 600 may display the phone numbers or names 602 for the various devices in user's device profile (i.e., user's different communication lines) along with a corresponding activate call forwarding link 604. If a user desires to forward calls for one of the user's devices, the user can click on the activate call forwarding link 604 to the right of the phone's number (or name). In response, the user may be presented with a new screen for selecting the number to which the calls are to be forwarded.

Figure 7:
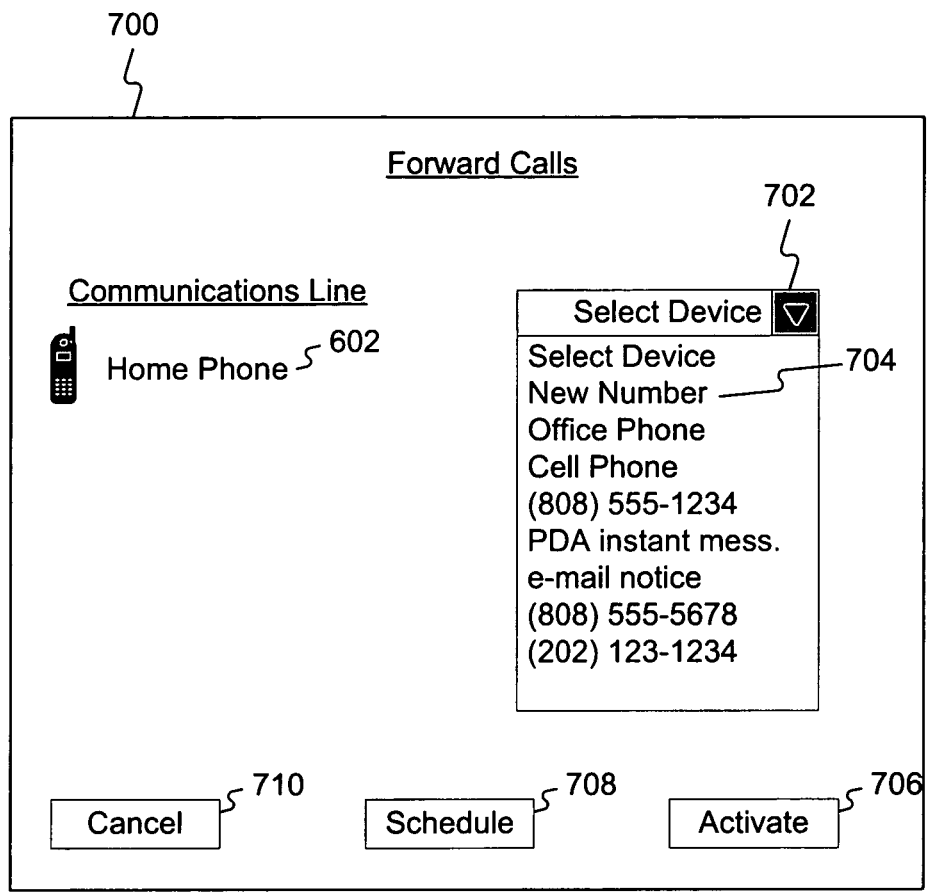
FIG. 7 illustrates an exemplary screen shot of a screen that may be displayed to a user to select a number to which calls are to be forwarded, consistent with the principles of the present invention.

FIG. 7 illustrates an exemplary screen shot of a screen 700 that may be displayed to a user to select a number to which calls are to be forwarded (hereinafter referred to as a forward-to-number). As illustrated, screen 700 may display the number 602 for which the user has selected to have calls forwarded. Additionally, screen 700 may display a pull down list 702 that includes a selection of numbers to which the calls are to be forwarded and/or user assigned nicknames for these devices. Numbers in pull down list 702 may include, for example, the numbers and/or names for the other communication devices in user's device profile, along with any other numbers/names saved by the user. The user may then select from this pull down list 702, for example, to forward calls to the user's cellular phone. Or, for example, the user may select the user's e-mail from this pull-down list to have an e-mail regarding the call sent to him including information regarding the call. Or, the user may select an instant messaging account to have an instant messaging regarding the call sent to him.

If the user selects to have calls forwarded to a number (device) not listed, the user may select New Number entry 704 from the pull down list. In response, the user may be presented with a text box to enter a number and nickname to which to forward the calls. This number and nickname may then be saved so that in the future the number and/or nickname are displayed in pull down list 702.

Once the user has selected the device to which calls are to be forwarded, the user may then click on activate button 706 to have the user's changes saved so that the desired call forwarding is implemented. Alternatively, the user may click on cancel button 710 to cancel call forwarding.

Additionally, the call forwarding screens may include a box (not shown) for permitting a user to initiate call forwarding to a particular number in the event the called device is not answered within a particular number of rings. For example, a user may desire that if the user's home phone is not answered within 4 rings, that the call be forwarded to the user's cell phone or to some other number (e.g., a number for a vacation house). In such, an example, the user may enter the number "4" in such a box. Or if the user desires that calls be automatically forwarded, the user may enter a 0.

Screen 700 further illustrates a schedule button 708. As discussed above, the user may desire to schedule call forwarding based upon the time of day, day of week, etc. In the event the user desires to schedule call forwarding, the user may click on schedule button 708 to bring up a new screen for scheduling call forwarding.

Figure 8:
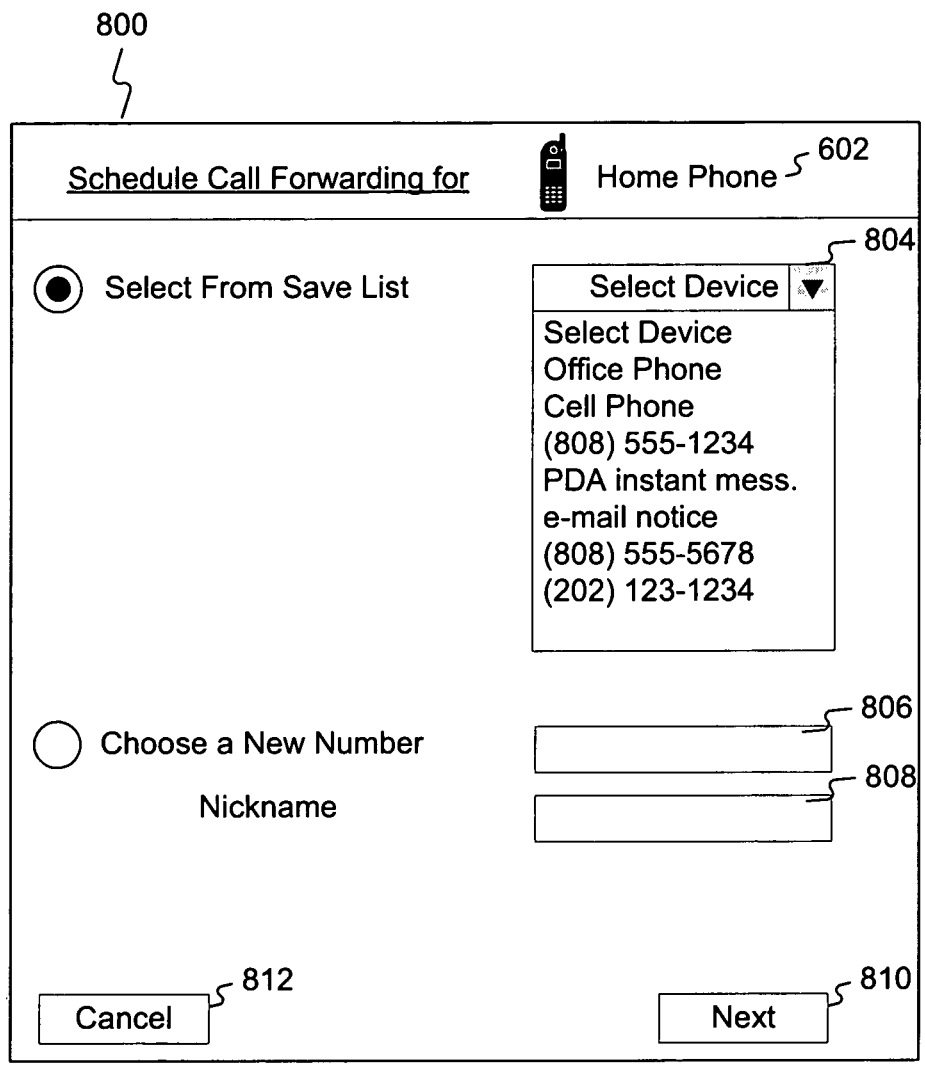
FIG. 8 illustrates an exemplary screen that may be displayed to a user to schedule call forwarding, consistent with the principles of the present invention.

FIG. 8 illustrates an exemplary screen 800 that may be displayed to a user to schedule call forwarding. As illustrated, screen 800 may illustrate the number for which they want calls forwarded 602 and a pull down list 804. As with the pull down list discussed above, this pull down list 804 may include the numbers and/or names for the other devices in user's device profile along with other numbers and/or names previously saved by the user. The user may then select from this pull down list a name and/or number to which to forward calls.

If, however, the user desires to have calls forwarded to a device/number not specified in pull-down list 804, the user may enter the new number in a new number box 806. The user may further specify a nickname for this number by entering it in then nickname box 808. This number may then be saved by the application so that in the future the nickname is displayed in the pull down lists. After the user selects the number to which they wish for calls to be forwarded, the user may select next button 810 and a new page may be displayed to the user to enter the scheduling information. Alternatively, the user may click on cancel button 812 to cancel call forwarding.

Figure 9:
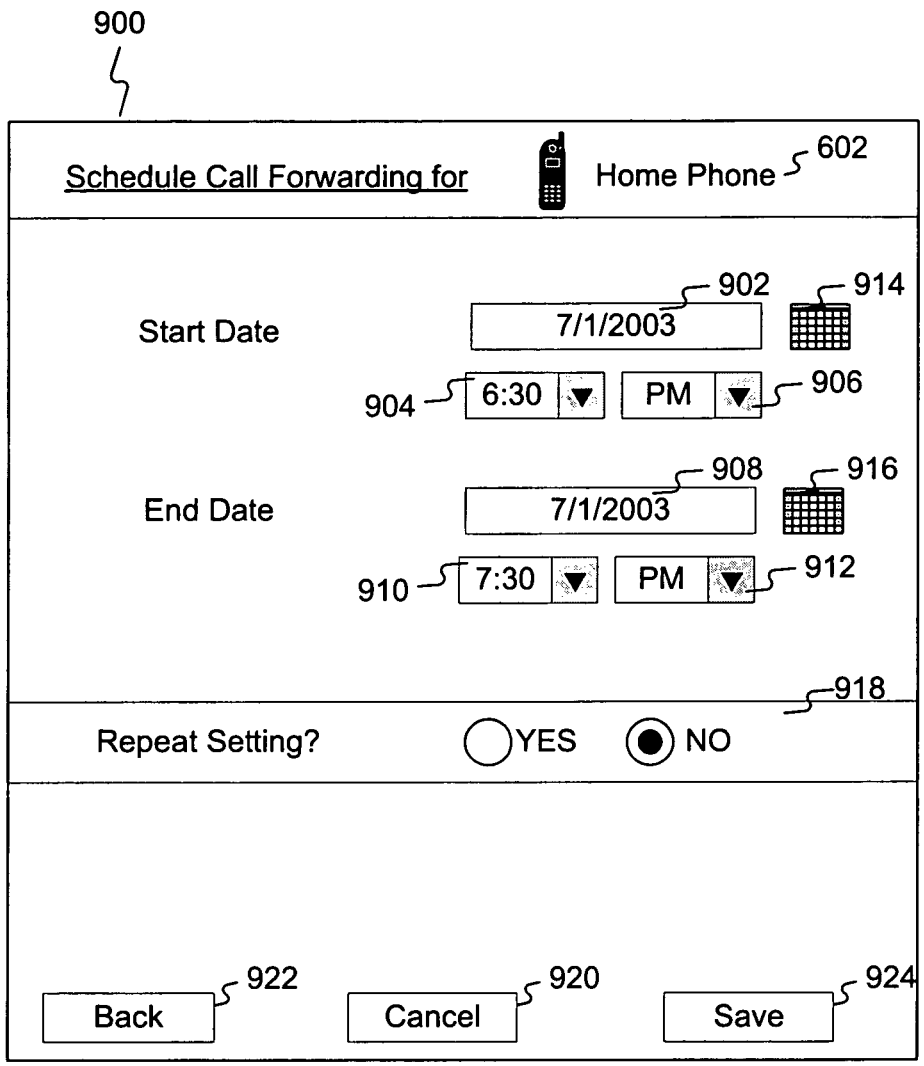
FIG. 9 illustrates an exemplary screen for entering scheduling information for call forwarding, consistent with the principles of the present invention.

FIG. 9 illustrates an exemplary screen 900 for entering scheduling information for call forwarding. As illustrated, the user may be presented with boxes for entering the start date 902, the start time 904, whether the start time is am or pm 906, the end date 908, the end time 910, and whether the end time is am or pm 912. Additionally, the user may be presented with a calendar button for selecting start date 914 and a calendar button for selecting end date 916. The calendar buttons 914 and 916 may be selected to display a calendar. The user may then select a particular day in the calendar and this date may then automatically be entered in start date 902 or end date 908 boxes, respectively.

Additionally, screen 900 may include a repeat setting check boxes 918 (e.g., yes or no) that a user may select if they wish for the user's call forwarding instructions to be repeated. For example, a user may desire that the call forwarding instructions be repeated daily, weekly, etc. If a user desires to have the user's call forwarding instructions repeated, the user may click on the yes box in the repeat setting check box 918. This in turn may cause additional options to be displayed to the user on screen 900.

Figure 10:
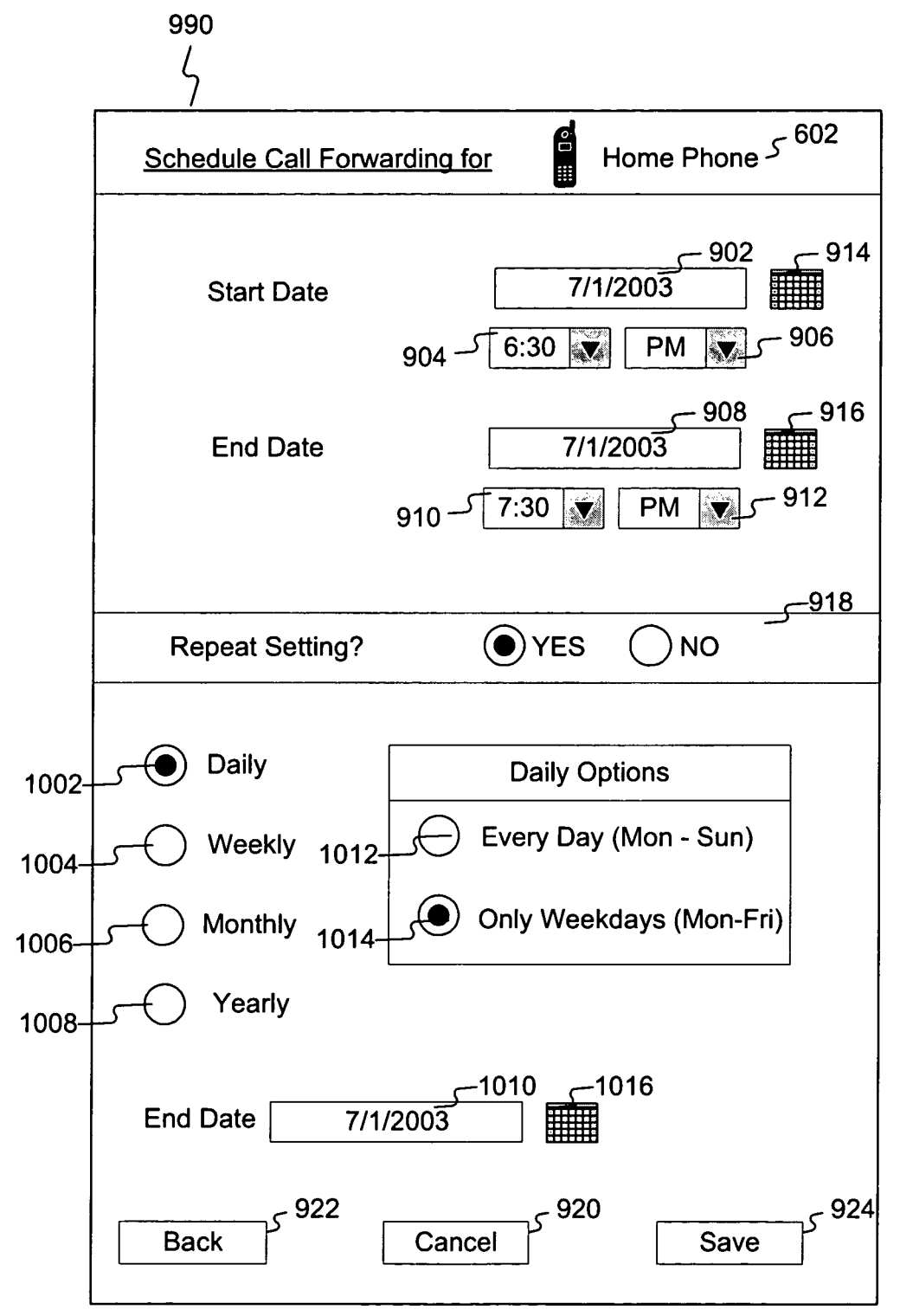

FIG. 10 illustrates an exemplary screen 990 for entering scheduling information for call forwarding where the user has selected to repeat the settings. As illustrated screen 990 includes check boxes for repeating the user's setting daily 1002, weekly, 1004, monthly 1006, and yearly 1008. Additionally, the screen includes a box for permitting the user to enter an end date 1010 for when the repeating is to end, along with a corresponding calendar button 1016 such as those described above. In this exemplary screen 1000, the user has selected the daily check box 1002. Accordingly, screen 1000 displays daily options to the user, such as for example, the option for the settings to be repeated ever day (Mon-Sun) 1012 or for the settings to be repeated only on weekdays (Mon-Fri) 1014.

Figure 11:
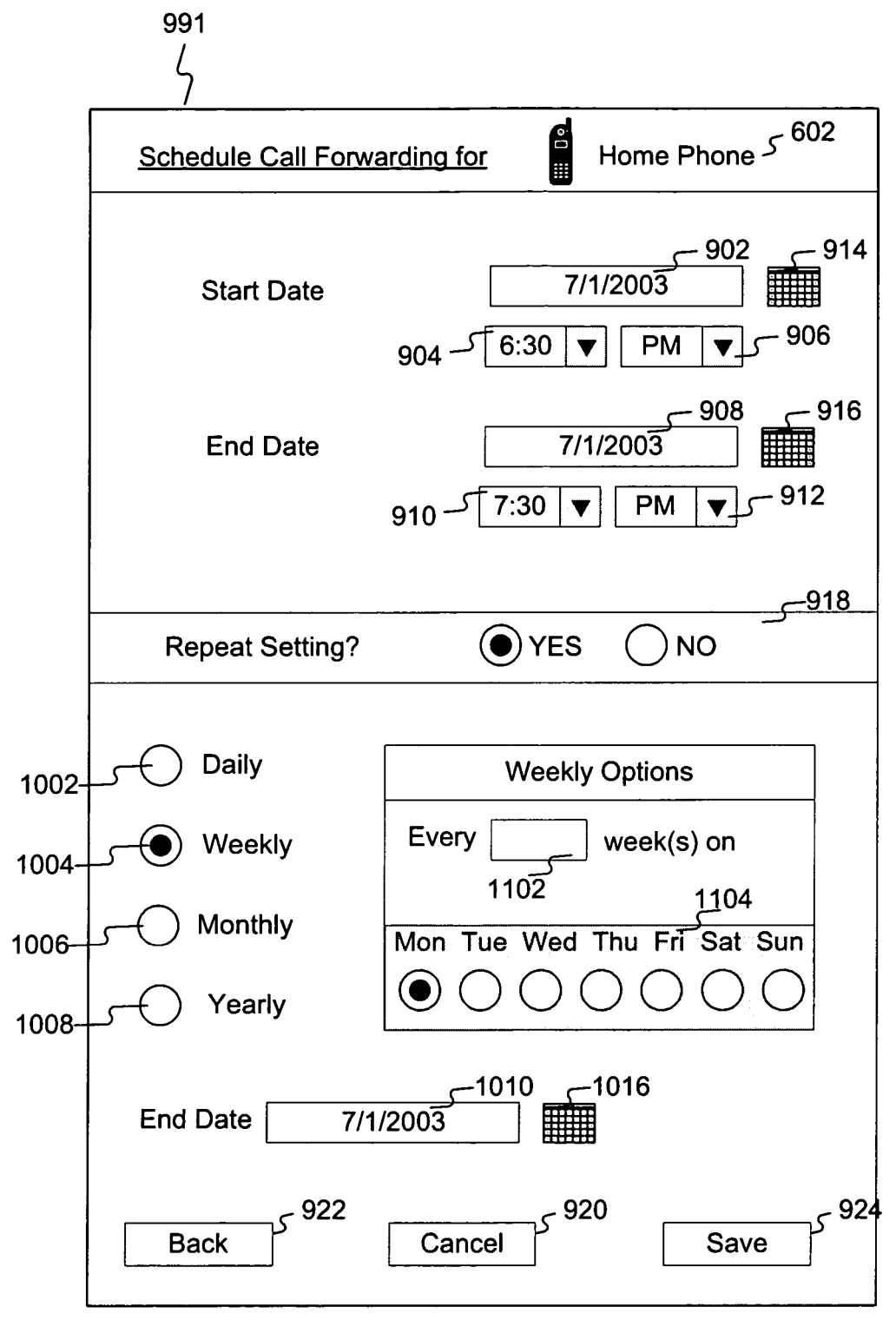

FIG. 11 illustrates an exemplary screen 991 for entering scheduling information for call forwarding where the user has selected to repeat the settings weekly. As discussed above, the user may select the weekly check box 1004. In response, screen 991 may display weekly options to the user, such as, for example, a box for entering how often they want the weekly setting repeated 1102 and check boxes for selecting the days of the week (i.e., Monday thru Sunday) for repeating settings 1104. For example, if the user wants the settings repeated every Monday and Tuesday, they may enter a 1 in box 1102 and select the check boxes for Monday and Tuesday 1104. Or, if, for example, the user wants the settings repeated every other week, they may enter a 2 in box 1102.

Figure 12:
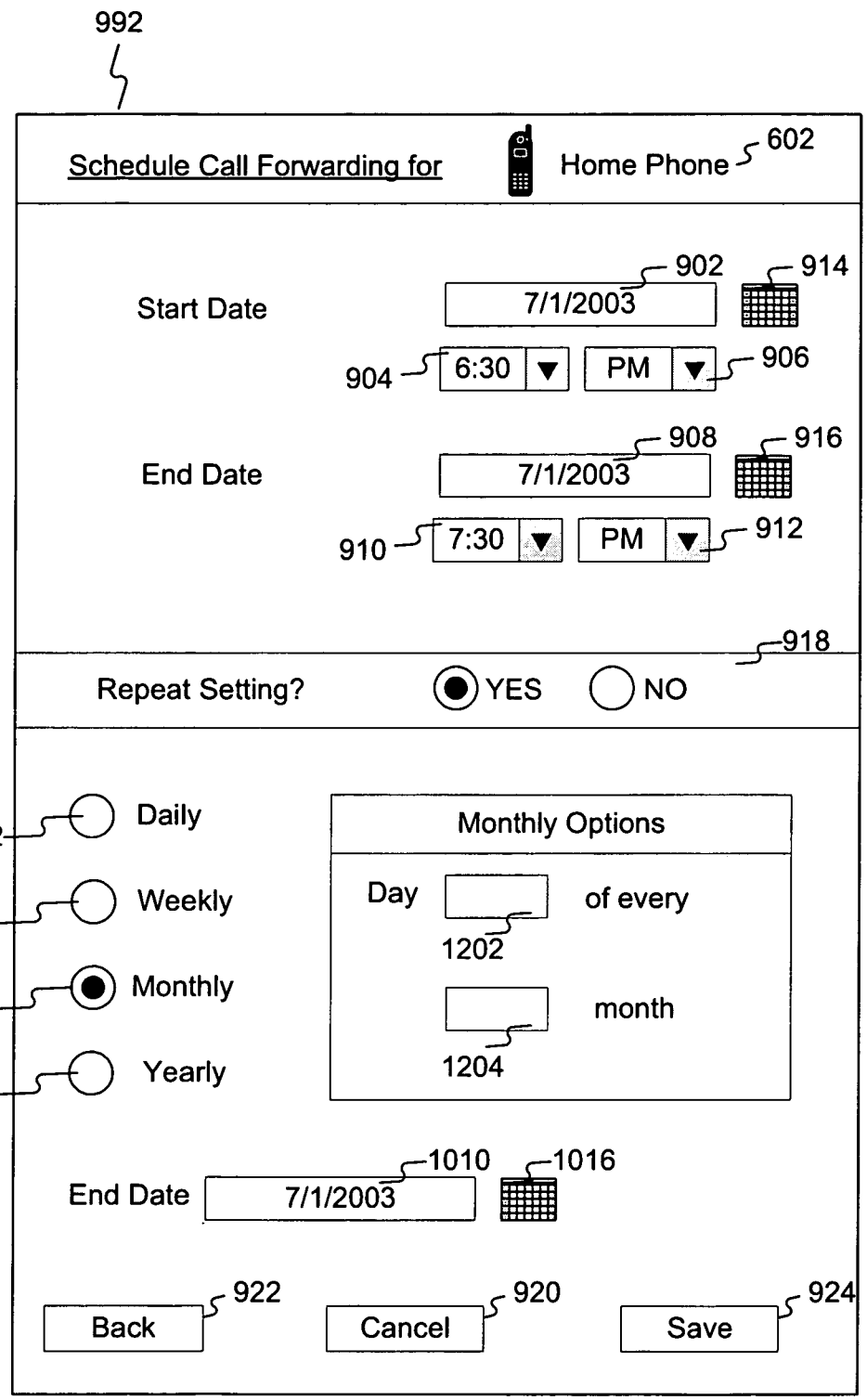
FIG. 12 illustrates an exemplary screen for entering scheduling information for call forwarding where the user has selected to repeat the settings monthly, consistent with the principles of the present invention.

FIG. 12 illustrates an exemplary screen 992 for entering scheduling information for call forwarding where the user has selected to repeat the settings monthly. As discussed above, the user may select the monthly check box 1006. In response, screen 992 may display monthly options to the user, such as, for example, a box 1202 for entering a particular day during a month for repeating the call forwarding and a box 1204 for entering how often they want the monthly setting repeated. For example, if the user wants the call forwarding to occur on the fifteenth of every month, they may enter a fifteen in box 1202 and a one in box 1204. Or, if the user wants the call forwarding to occur on the fifteenth of every other month, they may enter a fifteen in box 1202 and a two in box 1204.

Figure 13:
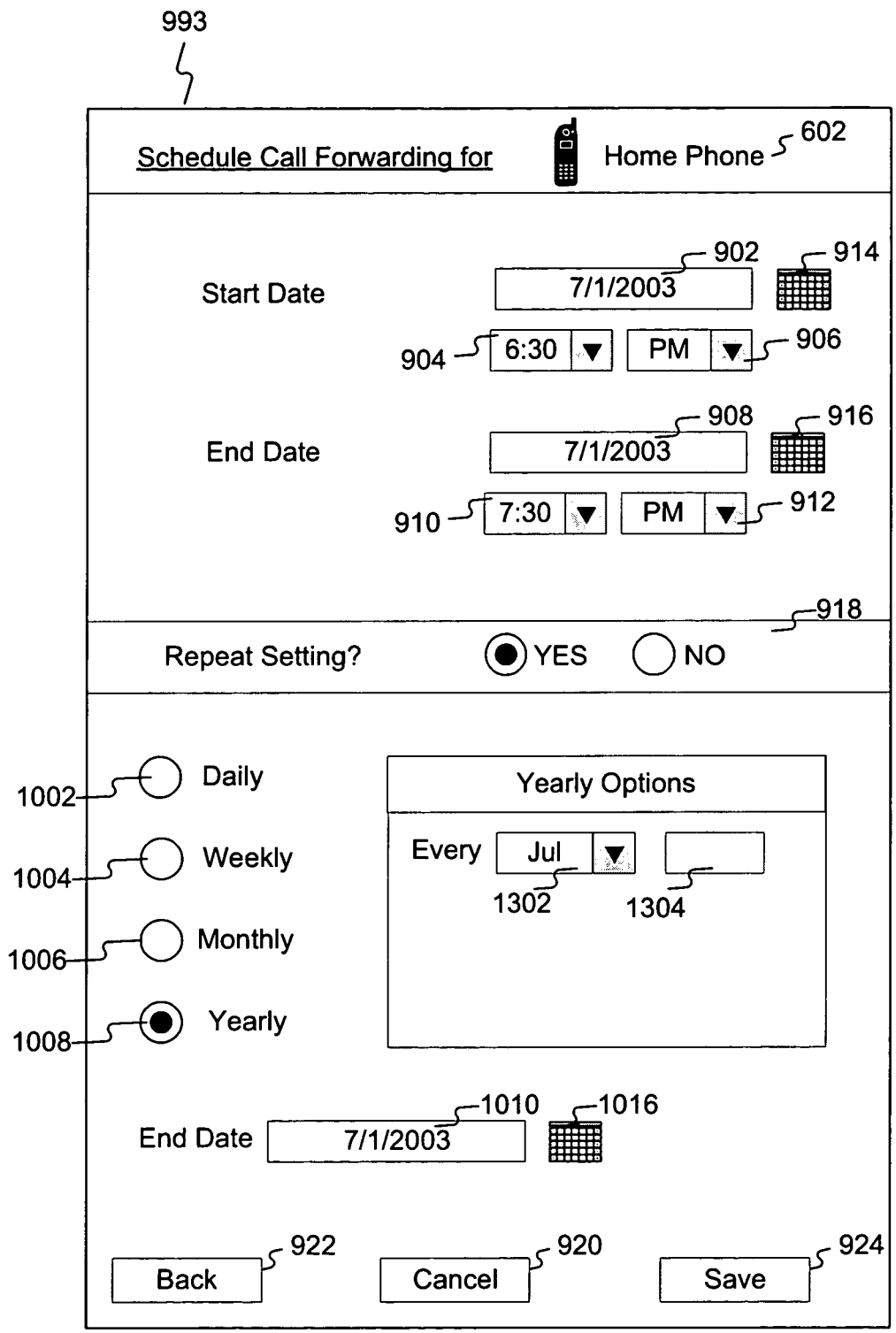
FIG. 13 illustrates an exemplary screen for entering scheduling information for call forwarding where the user has selected to repeat the settings yearly, consistent with the principles of the present invention.

FIG. 13 illustrates an exemplary screen 993 for entering scheduling information for call forwarding where the user has selected to repeat the settings yearly. As discussed above, the user may select the weekly check box 1008. In response, screen 993 may display yearly options to the user, such as, for example, a pull down list for selecting a particular month 1302 and a box for entering a particular day 1304. Then, for example, if the user wants the call forwarding to occur on July 4$^{th}$ of every year, they may select July from pull down list 1302 and enter a four in box 1304.

After the user has entered the user's desired call forwarding instructions, the user may then select save button 924 to have the user's changes saved and to implement the desired call forwarding. Alternatively, the user may select cancel button 920 to cancel call forwarding or back button 922 to return to the previous screen.

Once a user enters the information to implement call forwarding for one of the user's communications lines and has saved the user's changes the information may be forwarded from user terminal 112_A to digital companion servers 406 which stores the information in database 522.

In addition to having all calls to a particular communications line (i.e., communication device) forwarded, in this example the user may also be able to select to have all calls to the communications line treated in some other manner. For example, the user may select to have all calls to a particular communications line blocked and sent directly to voice mail. In one example, the user may be able to simply check a box next to the name/number for the communication line to block calls and then save the changes.

In addition to automatically handling all calls to a particular communication line in a particular manner, the user may also be able to treat calls differently based on the caller ID of the incoming call. For example, a user may want calls made to the user's office phone from a particular person (e.g., an important user) to be forwarded to the user's cell phone, and calls from a different person (e.g., a friend) to be forwarded to the user's home phone. In such, an example, user's cell phone will be treated as the forward-to device for calls from the user, while the person's home phone will be treated as the forward-to device for calls from the user's friend.

As discussed above, the system may provide a user address book that includes names, phone numbers, and/or addresses of people and/or organizations entered by the user. Further, as discussed above, this address book may be stored in contacts database 530. A user wishing to add, delete or modify contacts in the user's address book may bring up the DC client application, which may include an option for modifying the address book.

The DC client application may then contact digital companion servers 406 to retrieve user's address book. If user terminal 112_A is connected to the Internet, this may be accomplished, for example, by the DC client application on user terminal 112_A retrieving the address book from digital companion server(s) 406. In another example, the user may access and modify the user's address book by directly contacting communication portal 408 via a user terminal (e.g., user terminal 112_B) executing an appropriate client application such as, for example, a web browser application.

Once the user terminal (e.g., 112_A or 112_B) has retrieved the user's address book, the user may then add, delete, or modify its listed contacts. Additionally, the address book may also include an entry for each contact regarding how calls from this particular contact are to be handled. As discussed above, a user may wish that all calls from a particular contact be forwarded to user's cell phone. The user may then select on a particular entry in the user's address book to bring up details regarding this contact.

Figure 14:
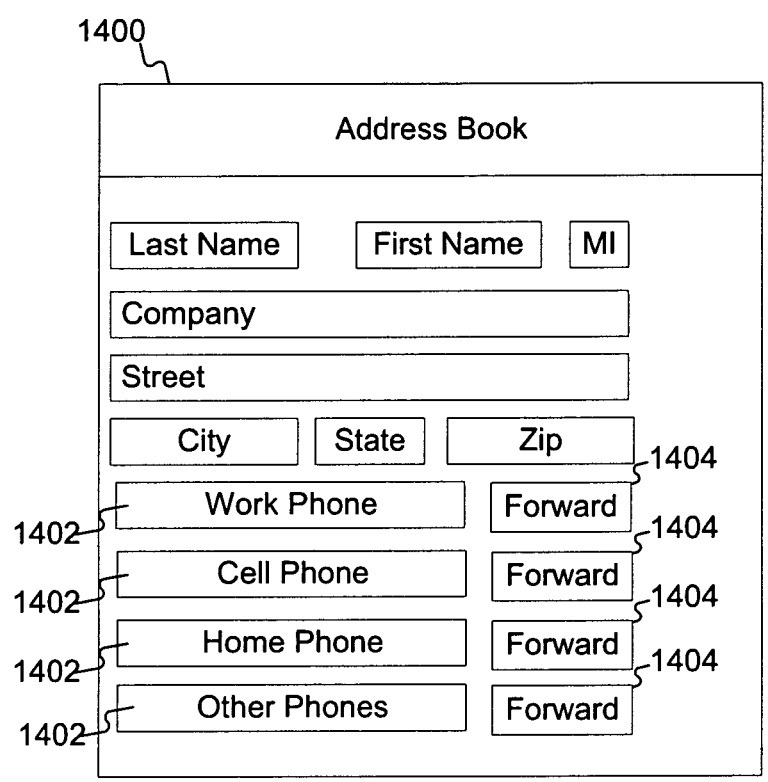
FIG. 14 illustrates a more detailed screen that, for example, a user may be presented with for a particular contact in the user's contact book, consistent with the principles of the present invention.

FIG. 14 illustrates a more detailed screen 1400 that, for example, a user may be presented with for a particular contact in the user's contact book. As illustrated, screen 1400 may include various phone numbers 1402 for the contact (e.g., a work number, cell phone number, home numbers, etc.). Additionally, screen 1400 may include a button for forwarding calls from this particular number 1404. A user may then click on this button to bring up subsequent screens for specifying how calls from this particular contact are to be treated. Such screens may, for example, be similar to the above-described FIGS. 7 through 13. Further, screen 1400 may also include additional buttons for selecting alternative handling of calls from this contact, such as, for example, blocking calls and forwarding him automatically to voice mail, playing a specially recorded message to the user, etc. Or, the screen may include a single button for selecting special handling. Then subsequent screens may be provided to the user so that the user may select the specialized handling. In the event, the user elects to play a announcement, the user may be presented with options for either selecting a prerecorded message or for recording an announcement. Also, this screen 1400 may also include a single button (not shown) for selecting a treatment for all numbers associated with the contact. Thus, rather than selecting individual treatments for each of the contacts numbers, the user may select such a button so that all calls from this contact are handled in a common manner.

Additionally, such screens may allow the user to modify a default handling forcalls for which they have not specified a specialized treatment. For example, the user may desire that for calls for which they have not specified a particular handling, that some other action be taken, such as, for example, forwarding the call to a particular number, playing a SIT tone, etc. For example, the user may specify a default handling for calls by using screens such as discussed above with reference to FIGS. 7 through 13. Then, calls to this particular communication line are handled in this default manner unless a particular treatment is specified for calls from a particular number.

Additionally, rather than have calls forwarded to a phone, in an embodiment, a user may select to have calls forwarded to an application, such as for example, an instant messenger application on a wireless personal data assistant (PDA) so that an instant message regarding the call that may include the caller-ID information regarding the call is sent to user's PDA. Additionally, digital companion server(s) 406 may use the caller-ID of the caller determine if the caller is also registered with digital companion server(s) 406. If so, digital companion server(s) 406 may determine if the caller has registered an instant messaging application. Then, if the caller also has an instant messaging application, digital companion server(s) 406 may establish a communication session between the instant messaging applications and direct, for example, that can audible message be played to a caller that the call has been forwarded to an instant messaging application. Then, the caller and the user may send each other instant messages.

After the user makes the user's selections, the user can elect to save the user's changes, such that they are stored by digital companion server(s) 406 and/or communication portal 408. For example, once the user elects to save the user's changes, the DC client application on user terminal 112_A may send these changes to the digital companion server(s) via web server 514. Application server 516 may then save these changes in the appropriate databases.

Figure 15:
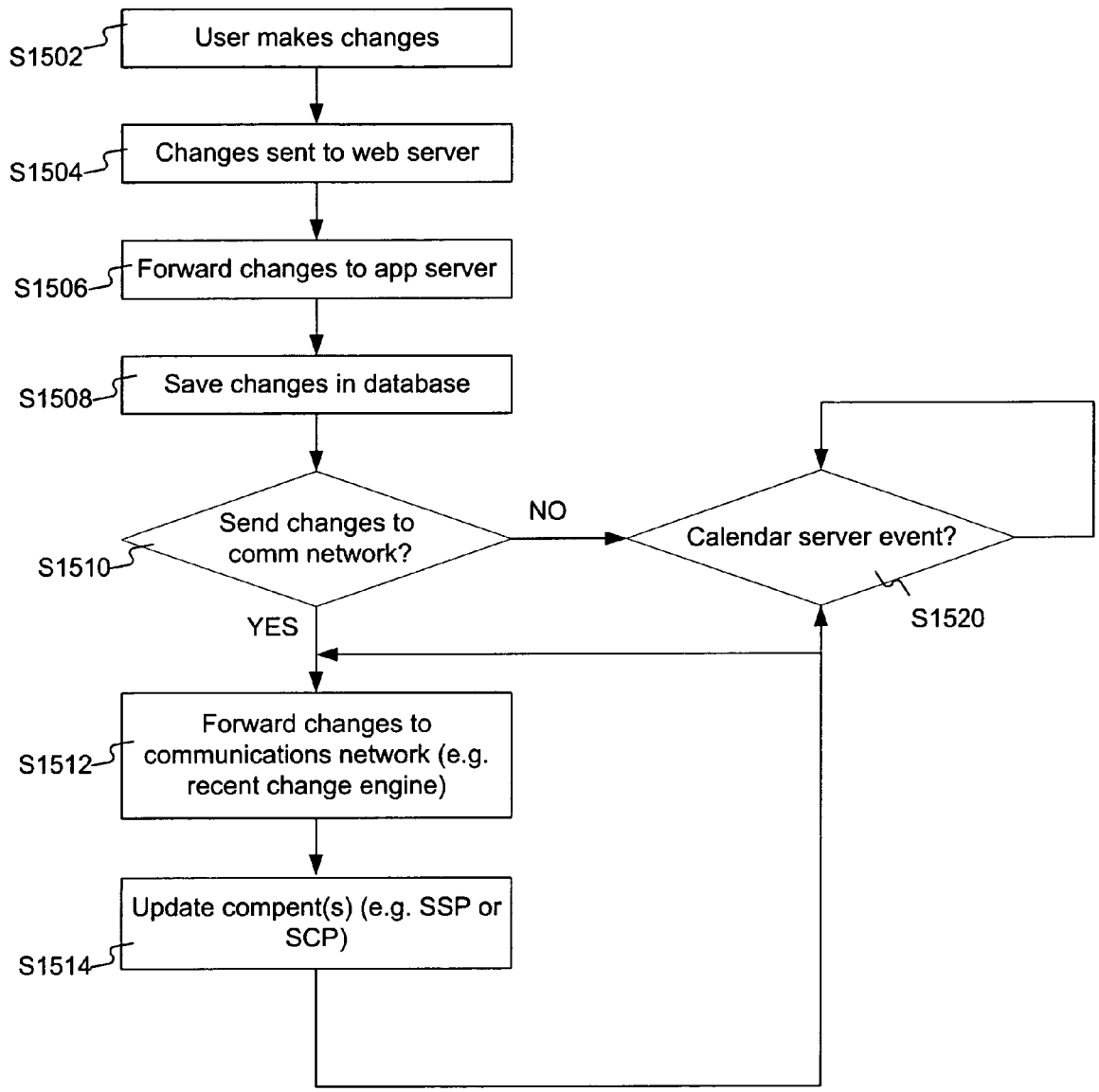
FIG. 15 illustrates a flow for chart for an exemplary method for implementing user's selections, consistent with the principles of the present invention.

FIG. 15 illustrates a flow for chart for an exemplary method for implementing user's selections, in accordance with methods and systems consistent with the invention. As discussed above, a user can make changes regarding how they want calls treated. (S1502). The user can then save the user's changes, such that the user's changes are forwarded to digital companion servers 406.

In one example, user terminal 112_A executes a DC client application that may send the changes via the Internet to web server 514 of digital companion servers 406. (S1504). Web server 514 receives the changes and then may forward the changes to application server 516. (S1506). Application server 514 then may save the changes in database 522. (S1508).

Application server 516 may then determine whether the handling of calls to any of the user's communications lines changed and whether or not to forward any modifications to the communications network. (S1510).

If application server 516 determines to modify the communications lines, application server 516 may forward appropriate instructions to the effected communications lines. (S1512). For example, application server 516 may determine that a forwarding update should be sent so that all calls addressed to a particular number are to be forwarded. Then, application server 516 may forward an instruction to the appropriate component of voice network 104. For example, if the application determines a forwarding update should be made, it may send an appropriate instruction to communication lines SSP 310 or ISCP 302 via its respective recent change engine 316. A further description of forwarding updates is presented below.

In an exemplary embodiment, two types of forwarding updates may be used: a Call Forward Variable (CFV) update, and an AIN update. For example, if SSP 310 (FIG. 3) servicing the communications line being modified (in this example user's home phone 114) does not support AIN services, a CFV update may be performed to implement the desired call forwarding (e.g., if SSP 310 is an older type switch not supporting AIN services.) Otherwise, an AIN update may be performed.

Accordingly, in this example, if application server 516 (FIG. 5) determines SSP 310 does not support AIN services, application server 516 performs a CFV update. Application server 516 may then send the forwarding information to the appropriate recent change engine 316 using a switch update message. (S1512). The recent change engines 316 then updates the CFV forwarding number in user's SSP 310. (S1514).

In this exemplary embodiment, SSP 310 stores a table including information regarding the phone numbers supported by SSP 310. This table may also include information regarding whether the phone numbers subscribe to caller ID services, voice mail services, etc. Additionally, this table may include an entry regarding whether or not to forward calls originally directed to this phone number to a different number along with the number to which the calls are to be forwarded (i.e., the forward-to number). Accordingly, in the example, recent change engine 316 modifies the SSP's table to activate call forwarding and to insert the forward-to-number in the table. Then when SSP 310 receives calls originally directed to this phone number, it automatically forwards him to the forward-to number.

If, however, in this example, application server 516 determines that SSP 310 supports AIN services, application server 516 may transmit the forwarding information via an AIN update request message to the appropriate recent change engine 316. (S1512). Recent change engine 316 then updates its respective ISCP SPACE 314. (S1514). For example, ISCP SPACE 314 for ISCP 302 supporting SSP 310 may store information regarding how to treat calls originally directed to user's home phone 114, including whether or not calls are to be forwarded and, if so, to what number. ISCP SPACE 314 may then receive the data from recent change engine 316 and propagate local database(s) associated with ISCP 302. These databases may be, for example, internal or external to ISCP 302 and/or ISCP SPACE 314.

As discussed above, the user may also schedule a user's call forwarding treatment. For example, a user may specify that calls from a particular contact be forwarded to the user's cell phone during evenings and on weekends, and calls from the same contact be forwarded to the user's office phone during the working hours of 9 a.m. to 5 p.m. on workdays. In such an example, when the time comes for the treatment to change, the calendar server 518 may send a message to application server 516 regarding the change in call treatment. (S1520.) In response, application server 516 may then transmit the modified forwarding information to the appropriate recent change engine 316 which in turn may transmit this information to SSP 310 or ISCP SPACE, as discussed above.

After the forwarding information is provided to SSP 310 or ISP SPACE 314, calls arriving at SSP 310 for user's phone 114 are automatically forwarded to the forward-to number.

Figure 16:
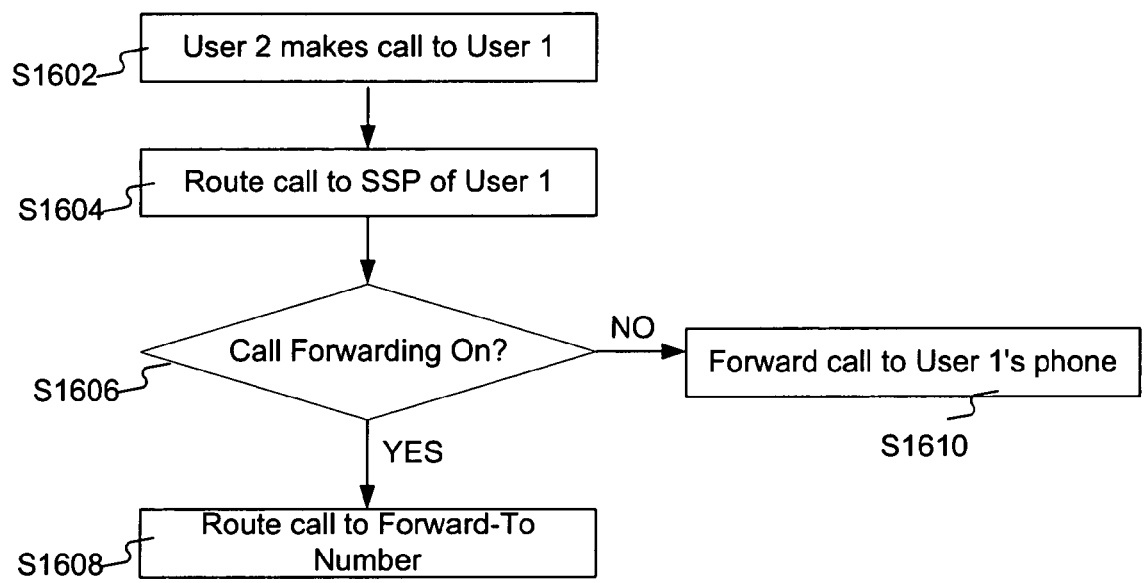
FIG. 16 illustrates a flow chart for a method for call forwarding by an SSP updated via a CFV update, consistent with the principles of the present invention.

FIG. 16 illustrates a flow chart for a method for call forwarding by an SSP 310 updated via a CFV update, in accordance with methods and systems consistent with the invention. As illustrated, a caller 120 ("user 2") places a call to the DC user's ("user 1") home phone 114. (S1602) The call from calling party 120 traverses network 104 and reaches SSP 310 servicing the user. (S1604). SSP 310 then looks up in its table to determine if call forwarding is activated. (S1606). If so, SSP 310 routes the call to the stored forwarding number instead of to the user's home phone 114. (S1608). If call forwarding is not activated, SSP 310 routes the call to user's home phone 114. (S1610).

Figure 17:
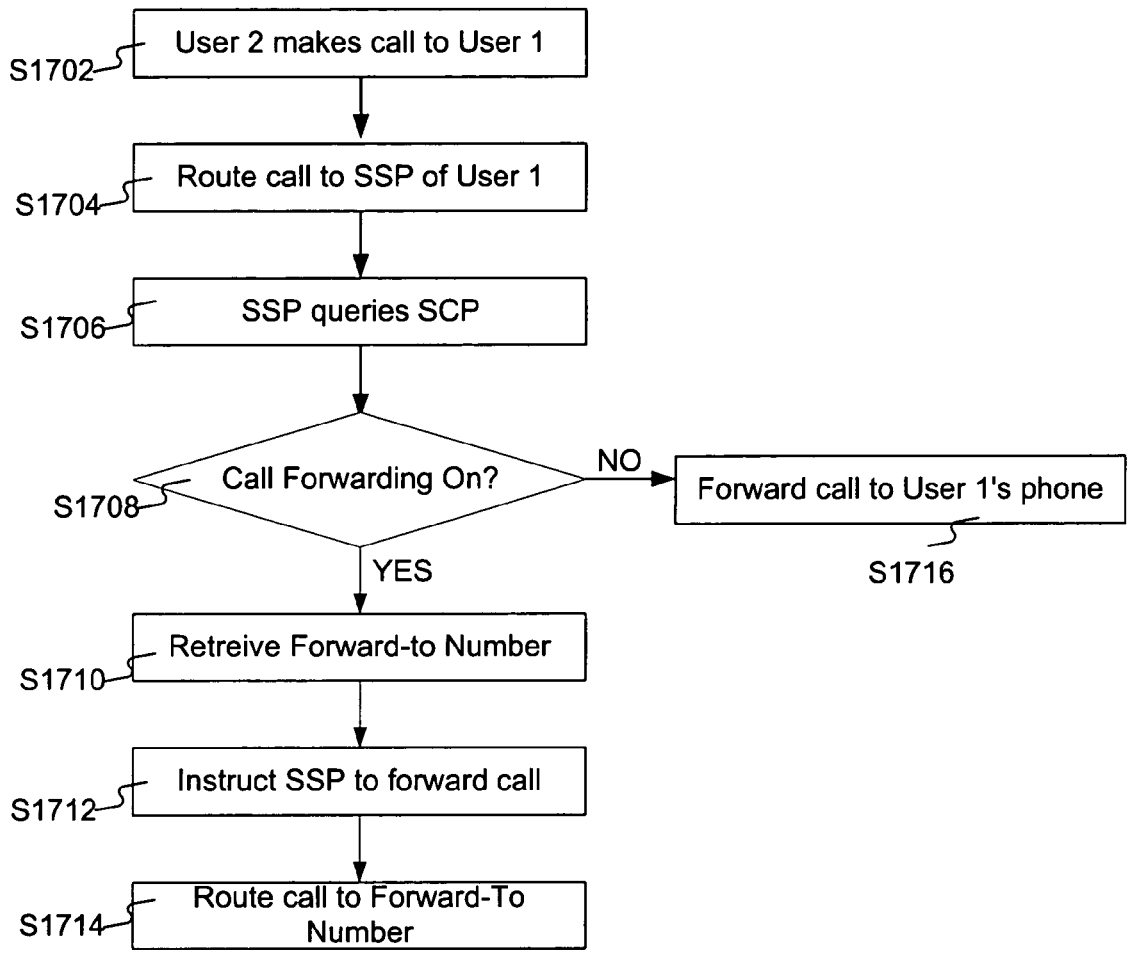
FIG. 17 illustrates a method for call forwarding for an SSP providing AIN services, consistent with the principles of the present invention.

FIG. 17 illustrates a method for call forwarding for an SSP 310 providing AIN services, in accordance with methods and systems consistent with the invention. As illustrated, a caller places a call to the user's home phone 114. (S1702) The call from the calling party traverses network 104 and reaches the SSP 310 servicing user 1. (S1704). When the call reaches SSP 310, it results in an AIN trigger and SSP 310 launches a query to ISCP 302. (S1706). The service logic program of ISCP 302 may then look up in its database(s) whether call forwarding service is to be applied. (S1780). If so, ISCP 302 retrieves the forwarding number from the database(s). (S1710). The service logic program of ISCP 302 then sends its response to SSP 310 instructing it to route to call to the forwarding number. (S1712). In response, SSP 310 forwards the call to the retrieved forwarding number. (S1714). If, however, call forwarding is not activated for users home phone 114, ISCP 302 directs SSP 310 to forward the call to user's home phone 114. (S1716).

Additionally, as discussed above, a user may select to have calls treated differently based on identity of the calling party (e.g., caller-ID information) rather than simply forwarding all calls addressed to a particular communications device. If so, application server 516 of digital companion server(s) 416 may access the user's address book, calendar, etc. to create a disposition list for the device. This disposition list identifies how calls from different numbers (i.e., with different caller-IDs) are to be handled (e.g., where to forward the calls, play a message or SIT tone, etc.).

Figure 18:
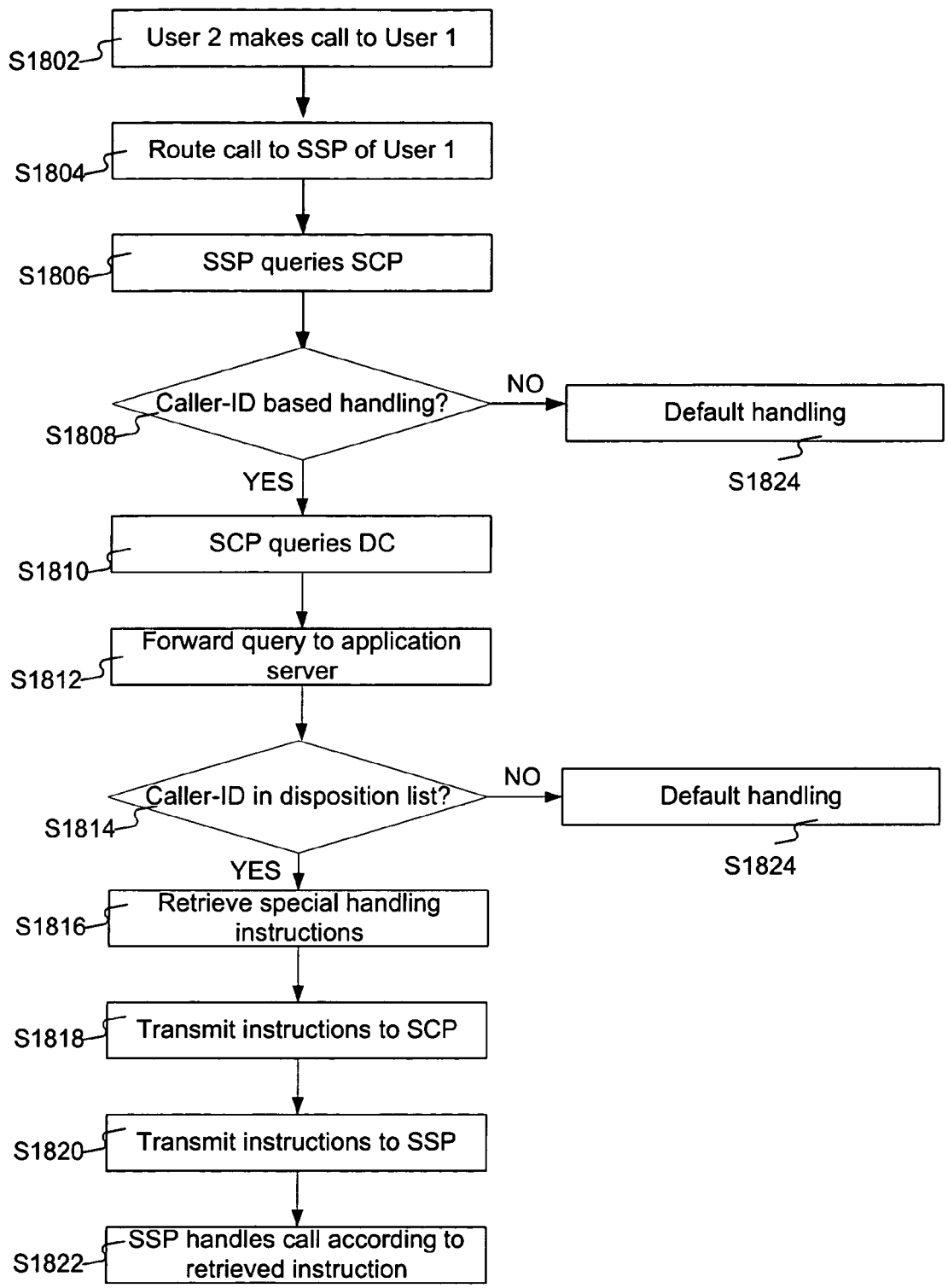
FIG. 18 illustrates a flow chart of a method for forwarding calls based on the caller-ID of the call, consistent with the principles of the present invention.

FIG. 18 illustrates a flow chart of a method for forwarding calls based on the caller-ID of the call in accordance with methods and systems consistent with the invention. First, a call is placed to the user's home phone 114. (S1802). The call is then routed by network 104 to SSP 310, which is associated with user phone 114. (S1804). SSP 310 then generates a trigger that is picked up by ISCP 302 (S1806). This trigger may be, for example, a Termination Attempt Trigger (TAT) or a specific Digit String (SDS). ISCP 302 then determines if special handling based on caller-ID should be applied. (S1808). If so, ISCP 302 queries Digital Companion server(s)

406 through network access server 410 (S1810). This query may include the caller-ID of the calling party's phone number (i.e., "caller-ID").

This query is then forwarded to application server 516 of digital companion 406. (S1812). Application server 516 then looks up the caller-ID in the disposition list (S1814). If the number is found in the disposition list, application server 516 retrieves from the disposition list the handling for the call (S1816). Application server 516 then instructs ISCP 302 to handle the call according to the retrieved handling instructions (S1818). ISCP 302 then instructs SSP 310 how to handle the call (S1820). In response, SSP 310 handles the call according to the received instructions. (S1822).

In a first example, the call is to be forwarded to a particular number ("forward-to number"), such as for example, to a cell phone. In such an example, application server 516 may send an instruction to forward the call to ISCP 302 via network access server 410 (S1818). ISCP 302 may then instruct SSP 310 to forward the call to the forward-to number, i.e. to the cell phone (S1820). In response, SSP 310 forwards the call to the forward-to number (S1822). Further, as discussed above, the user may elect to only forward the call if the called number is not answered within a user specified number of rings.

In a second example, the caller-ID may not exist in the disposition list and application server 516 may elect to apply a user specified default treatment to the call (S1824). For example, the user may elect for home phone 114 to ring if no specific treatment is specified. In other examples, the default may be set to forward the call to a particular number such as mobile phone or a vacation number, if, for example, the user is on vacation. In such an example, the default handling may be stored in digital companion server(s) 406 and then retrieved and forwarded by application server 516 to ISCP 302 as discussed above. Or, in another example, application server 516 may simply send an instruction to ISCP 302 to handle the call according to its default (e.g., the information stored in ISCP 302 or SSP 306 regarding handling of calls to this communications line).

In a third example, a user may select that calls from a particular caller-ID be sent directly to voice mail. In such an example, application server 516 may send an instruction to ISCP 302 forward the call to voice mail (S1818). ISCP 302 then may send an instruction to the SSP 310 (S1820). In response, SSP 310 forwards the call to an IP 320 providing voice mail services (S1822).

In a fourth example, the user may select that a SIT tone be played to the caller based on the caller-ID or in the event the caller-ID is unavailable. In such an example, application server 516 may send an instruction to play a SIT tone to ISCP 302. (S1818). In response, ISCP 310 may direct SSP 310 to forward the call to an IP which in turn plays a SIT tone. (S1820). The call may then be terminated or forwarded to voice mail, etc. (S1822). Alternatively, rather than playing a SIT tone, the user may direct that a particular voice recording be played to the caller based on the caller-ID.

In yet another example, the user may specify both a primary and a secondary handling procedure for calls, such that the secondary handling procedure is implemented if for example the primary handling procedure cannot be completed or some other criteria is met, such as, for example, user specified criteria. For example, the user may desire to have calls to their home phone from a particular contact ring the home phone, but if the home phone is busy or not answered within a specific number of rings then forward the call to the user's cell phone. The user may also be able to schedule these primary and secondary handling procedures.

The user may specify these primary and secondary handling procedures in a similar manner to the scheduling of a single handling procedure using screens such as those described above, wherein these screens provide the user with the ability to specify both primary and secondary handling procedures. Additionally, these screens may permit the user to specify when the secondary handling procedure should be used. For example, the user may specify that the secondary handling procedure be used if the primary handling procedure cannot be completed because the line is busy or not answered in a predetermined number of rings, or, if the phone is turned off or out of range as may, for example, be the case with wireless phones.

In the example of a user specifying both a primary and secondary handling procedure, when a call arrives at the communications line, the application server 514 may determine based on the user specified criteria, whether to apply the primary or secondary handling procedures. The application server 514 may then direct that the call be handled based on the determined procedure using methods and systems, such as those discussed above.

In another example, in addition to the user specifying that the handling procedure be based on a schedule, the user may also be capable of specifying the handling procedure based on the user's location. For example, the user may be able to specify for calls to be forwarded to their office phone if, for example, the user is logged on to the digital companion server(s) via a computer in the user's office. Or, for example, the user may specify that the calls be forwarded to the user's wireless phone if for example, the user is logged on to the digital companion server(s) via a wireless device, such as, for example, their wireless phone or a PDA. Additionally, in another example, the user may have a device with Global Positioning System (GPS) type capabilities such that the user's location is forwarded to the digital companion server(s) 416. The user in such an example may then specify how to handle calls from contact(s) based upon the information regarding the user's location.

In yet another example, the above-discussed screens may include options for adding contacts from the user's address book to various lists, such as for example, a selective call acceptance list, a selective call rejection list and a selective call forwarding list. For example, if a contact is added to the selective call acceptance list and the user has selected to block calls, then the digital companion server(s) 416 may determine whether or not the caller-ID information is on the selective acceptance list and if so complete the call to the called device, and if not, send the call to voice mail. If, for example, a contact is on the selective call rejection list, then calls from the contact may be sent directly to voice regardless of whether or not the user has selected to block all calls. Additionally, if, for example, a contact is on the selective call forwarding list, then the digital companion server(s) 416 may direct that calls from this contact be forwarded to a number associated with the selective call forwarding list.

In yet another example, the user may be able to define groups of contacts such that calls from any of the contacts in the group are handled in a common manner. For example, the user using screens similar to those discussed above may create a group of all contacts in the user's address book that work with the user. The user may then give this group a name (e.g., co-workers) such that this group becomes a separate entity in the user's address book. The user may then, for example, select a handling procedure for this group so that any call from any member of the group is handled according to the handling procedure for the group.

While the present invention has been described in connection with various embodiments, many modifications will be readily apparent to those skilled in the art. One skilled in the art will also appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. Accordingly, embodiments of the invention are not limited to the above described embodiments and examples, but instead is defined by the appended claims in light of the user's full scope of equivalents.

What is claimed is:

1. A method for management of a communications line associated with a communications device and with a user of a communications network, the communications network comprising a voice network and a data network, the method comprising:
   receiving, at a server, line management information from the user over the data network, the server being in communication with the data network and the voice network, the line management information comprising:
      information identifying the communications line; and
      information requesting a modification to the identified communications line, the requested modification identifying an additional communications device to which calls received by the identified communications line are forwarded;
   determining, at the server, whether the requested modification would change a procedure for handling of calls directed to the identified communications line;
   generating, at the server, an instruction to implement the requested modification when the requested modification would change the procedure, the generating comprising:
      obtaining, from a database, information associated with the identified communications line;
      determining, based on the obtained information, a property of the communications network associated with the communications line, the communications network property being indicative of a functionality of a component of the voice network that services the identified communications line that is required to implement the modification; and
      generating, based on at least the communications network property, a signal to implement the requested modification at the voice network component in accordance with the functionality; and
   transmitting the generated instruction to the voice network component to implement the requested modification.

2. The method of claim 1, wherein transmitting the generated instruction comprises transmitting the generated instruction to a service control point.

3. The method of claim 2, wherein transmitting the generated instruction to the service control point comprises transmitting the generated instruction to a service provisioning and creation environment.

4. The method of claim 1, wherein transmitting the generated instruction comprises transmitting the generated instruction to a switch.

5. The method of claim 1, wherein the information identifying the communications line comprises contact information, the contact information comprising at least one of a contact name and a contact phone number.

6. The method of claim 5, wherein the requested modification identifies the additional communications device based on at least one of the contact name and the contact phone number.

7. The method of claim 1, wherein the requested modification identifies the additional communications device based on a user-defined time schedule and the time the call is received.

8. The method of claim 5, wherein:
   the additional communications device comprises one or more processors providing voice mail services; and
   the requested modification identifies the one or more processors based on at least one of the contact name and the contact phone number.

9. The method of claim 1, wherein the additional communications device comprises one or more processors for playing an audible signal indicative of the communications line being unavailable.

10. A system for management of a communications line associated with a communications device and with a user of a communications network, the communications network comprising a voice network and a data network, the system comprising:
    a first interface for connecting to the data network;
    a second interface for connecting to the voice network; and
    a server comprising one or more processors in communication with the first and second interfaces, the server being configured to:
       receive line management information from the user via the first interface, the line management information comprising:
          information identifying the communications line; and
          information requesting a modification to the identified communications line, the requested modification identifying an additional communications device to which calls received by the identified communications line are forwarded;
       determine whether the requested modification would change a procedure for handling of calls directed to the identified communications line;
       generate an instruction to implement the requested modification when the requested modification would change the procedure, the server being further configured to:
          obtain, from a database, information associated with the identified communications line;
          determine, based on the obtained information, a property of the communications network associated with the communications line, the communications network property being indicative of a functionality of a component of the voice network that services the identified communications line that is required to implement the modification; and
          generate, based on at least the communications network property, a signal to implement the requested modification at the voice network component in accordance with the functionality, and
       transmit the generated instruction, via the second interface, to the voice network component to implement the requested modification.

11. The system of claim 10, further comprising a recent change engine for receiving the generated instruction from the server and transmitting the generated instruction to a service control point.

12. The system of claim 11, wherein the service control point includes a service provisioning and creation environment and wherein the recent change engine is capable of transmitting the generated instruction to the service provisioning and creation environment of the service control point.

13. The system of claim 10, further comprising a recent change engine for receiving the generated instruction from the server and transmitting the generated instruction to a switch.

14. The system of claim 13, wherein the switch includes a table and wherein the recent change engine is capable of modifying the table.

15. The system of claim 10, wherein the requested modification identifies the additional communications device based on contact information, the contact information comprising at least one of a contact name and a contact phone number.

16. The system of claim 15, wherein the requested modification identifies the additional communications device based on a user-defined time schedule and a time the call is received.

17. The system of claim 10, wherein the additional communications device comprises one or more processors providing voice mail services.

18. The system of claim 10, wherein the additional communications device comprises one or more processors for playing an audible signal indicative of the communications line being unavailable.

19. A system for management of a communications line associated with a communications device and with a user of a communications network, the communications network comprising a voice network and a data network, the system comprising:
- means for receiving, at a server, line management information from the user over the data network, the server being in communication with the data network and the voice network, the line management information comprising:
  - information identifying the communications line; and
  - information requesting a modification to the identified communications line, the requested modification identifying an additional communications device to which calls received by the identified communications line are forwarded;
- means for determining, at the server, whether the requested modification would change a procedure for handling of calls directed to the identified communications line;
- means for generating, at the server, an instruction to implement the requested modification when the requested modification would change the procedure, the means for generating comprising:
  - means for obtaining, from a database, information associated with the identified communications line;
  - means for determining, based on the obtained information, a property of the communications network associated with the communications line, the communications network property being indicative of a functionality of a component of the voice network that services the identified communications line that is required to implement the modification; and
  - means for generating, based on at least the communications network property, a signal to implement the requested modification at the voice network component in accordance with the functionality; and
- means for transmitting the generated instruction to the voice network component to implement the requested modification.

20. The system of claim 19, wherein the means for transmitting the generated instruction to a component of the voice network comprises means for transmitting the generated instruction to a service control point.

21. The system of claim 20, wherein the means for transmitting the generated instruction to the service control point comprises means for transmitting the generated instruction to a service provisioning and creation environment.

22. The system of claim 19, wherein the means for transmitting the generated instruction to the component of the voice network comprises means for transmitting the generated instruction to a switch.

23. The system of claim 19, wherein the information identifying the communications line comprises contact information, the contact information comprising at least one of a contact name and a contact phone number.

24. The system of claim 23, wherein the requested modification identifies the additional communications device based on at least one of the contact name and the contact phone number.

25. The system of claim 19, wherein the requested modification identifies the additional communications device based on a user-defined time schedule and the time the call is received.

26. The system of claim 19, wherein the additional communications device comprises one or more processors providing voice mail services.

27. The system of claim 19, wherein the additional communications device comprises one or more processors for playing an audible signal indicative of the communications line being unavailable.

28. A method for management of a communications line associated with a communications device and with a user of a communications network, the communications network comprising a voice network and a data network, the method comprising:
- receiving, at a server, line management information from the user over the data network, the server being in communication with the data network and the voice network, the line management information comprising:
  - information identifying the communications line; and
  - information requesting a modification to the identified communications line, the requested modification identifying an additional communications device to which calls received by the identified communications line are forwarded;
- determining, at the server, whether the requested modification would change a procedure for handling of calls directed to the identified communications line;
- generating, at the server, an instruction to implement the requested modification when the requested modification would change the procedure, the generating comprising:
  - obtaining, from a database, information associated with the identified communications line;
  - determining, based on the obtained information, a property of the communications network associated with the communications line, the communications network property being indicative of a functionality of a component of the voice network that services the identified communications line that is required to implement the modification; and
  - generating, based on at least the communications network property, a signal to implement the requested modification at the voice network component in accordance with the functionality; and
- transmitting the generated instruction to a service control point of the voice network to implement the requested modification.

29. A system for management of a communications line associated with a communications device and with a user of a communications network, the communications network comprising a voice network and a data network, comprising:

a first interface for connecting to the data network;
a second interface for connecting to the voice network; and
a server comprising one or more processors in communication with the first and second interfaces, the server being configured to:
  receive line management information from the user via the first interface the line management information comprising:
    information identifying the communications line; and
    information requesting a modification to the identified communications line, the requested modification identifying an additional communications device to which calls received by the identified communications line are forwarded;
  determine whether the requested modification would change a procedure for handling of calls directed to the identified communications line;
  generate an instruction to implement the requested modification when the requested modification would change the procedure, the server being further configured to:
    obtain, from a database, information associated with the identified communications line;
    determine, based on the obtained information, a property of the communications network associated with the communications line, the communications network property being indicative of a functionality of a component of the voice network that services the identified communications line that is required to implement the modification; and
    generate, based on at least the communications network property, a signal to implement the requested modification at the voice network component in accordance with the functionality; and
  transmit the generated instruction, via the second interface, to a service control point of the voice network to implement the requested modification.

30. A system for management of a communications line associated with a communications device and with a user of a communications network, the communications network comprising a voice network and a data network, the system comprising:
  means for receiving, at a server, line management information from a device over the data network, the server being in communication with the data network and the voice network, the line management information comprising:
    information identifying the communications line; and
    information requesting a modification to the identified communications line, the requested modification identifying an additional communications device to which calls received by the identified communications line are forwarded;
  means for determining, at the server, whether the requested modification would change a procedure for handling of calls directed to the identified communications line;
  means for generating, at the server, an instruction to implement the requested modification when the requested modification would change the procedure, the means for generating comprising:
    means for obtaining, from a database, information associated with the identified communication line;
    means for determining, based on the obtained information, a property of the communications network associated with the communications line, the communications network property being indicative of a functionality of a component of the voice network that services the identified communications line that is required to implement the modification; and
    means for generating, based on at least the communications network property, a signal to implement the requested modification at the voice network component in accordance with the functionality; and
  means for transmitting the generated instruction to a service control point of the voice network to implement the requested modification.

\* \* \* \* \*